US008619880B2

(12) United States Patent
Teng et al.

(10) Patent No.: US 8,619,880 B2
(45) Date of Patent: Dec. 31, 2013

(54) UNIVERSAL BLOCKINESS CORRECTION

(75) Inventors: Chia-Yuan Teng, San Diego, CA (US); Sharath Manjunath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1334 days.

(21) Appl. No.: 11/870,353

(22) Filed: Oct. 10, 2007

(65) Prior Publication Data

US 2009/0097575 A1 Apr. 16, 2009

(51) Int. Cl.
*H04N 7/12* (2006.01)
(52) U.S. Cl.
USPC ............. 375/240.29; 375/240; 375/240.02; 375/240.03; 375/240.24
(58) Field of Classification Search
USPC ............. 375/240.13, 240.02, 240.16, 240.29, 375/240.24
See application file for complete search history.

(56) References Cited

U.S. PATENT DOCUMENTS

| 4,731,865 A | 3/1988 | Sievenpiper |
| 2002/0136303 A1 | 9/2002 | Sun et al. |
| 2003/0219073 A1 | 11/2003 | Lee et al. |
| 2005/0013494 A1 | 1/2005 | Srinivasan et al. |
| 2005/0207492 A1* | 9/2005 | Pao .......................... 375/240.16 |
| 2006/0078052 A1 | 4/2006 | Dang |
| 2006/0110056 A1 | 5/2006 | Gambhire |
| 2006/0268985 A1* | 11/2006 | Liang et al. .............. 375/240.16 |
| 2008/0031336 A1* | 2/2008 | Yamaguchi .............. 375/240.16 |
| 2008/0063085 A1 | 3/2008 | Wu et al. |

FOREIGN PATENT DOCUMENTS

| EP | 1404136 A1 | 3/2004 |
| JP | 2003116132 A | 4/2003 |
| JP | 2007036463 A | 2/2007 |
| RU | 2154918 C1 | 8/2000 |
| WO | 2006073124 A1 | 7/2006 |
| WO | WO2006128081 A2 | 11/2006 |
| WO | WO2007047786 | 4/2007 |
| WO | WO 2007047786 A2 * | 4/2007 |

OTHER PUBLICATIONS

ITU-T Recommendation H.264, Nov. 2007, pp. 221-226.*
"H.26L Test Model Long Term No. 6 (TML-6) Draft 0," ITU-T Telecommunication Standardization Sector of ITU, Geneva, CH, Jan. 9, 2001, pp. 1-35, XP001089815.
International Search Report and Written Opinion—PCT/US2008/079648, International Search Authority—European Patent Office—Apr. 2, 2009.
Min-Cheol Hongsoongsil University et al: "Need of loop/Post Deblocking Filter for H.26L" Joint Video Team (JVT) of ISO/IEC MPEG & ITU-T VCEG (ISO/IEC JTC1/SC29IWG11 and ITU-T SG16 Q6), XX, XX, No. q15k22, Aug. 17, 2000, XP030003115.

(Continued)

*Primary Examiner* — Omar Mian
(74) *Attorney, Agent, or Firm* — Kevin T. Cheatham

(57) ABSTRACT

Techniques to remove inherited blockiness with a low million instructions per second (MIPs) are provided. In one configuration, a device comprises a processor operative to implement a set of instructions to universally correct blockiness. The processor commandeers the in-loop deblocking filtering engine and universally corrects blockiness, including inherited blockiness, using the in-loop deblocking filtering engine.

11 Claims, 20 Drawing Sheets

(56) References Cited

OTHER PUBLICATIONS

Tsu-Ming Liu et al: "An In/Post-Loop Deblocking Filter With Hybrid Filtering Schedule" IEEE Transactions on Circuits and Systems for Video Technology, IEEE Service Center, Piscataway, NJ, US, vol. 17, No. 7, Jul. 1, 2007, pp. 937-943, XP011186544, ISSN: 1051-8215, *p. 938, left-hand column*.
Xiaoyan Sun et al: "In-loop deblocking filter for block-based video coding" Signal Processing, 2002 6th International Conference•On Aug. 26-30, 2002, Piscataway, NJ, USA, IEEE, vol. 1, Aug. 26, 2002, pp. 33-36, XP010627917.
Xilinx, H.264 Deblocker Core v1.0, DS592(v1.0), May 31, 2007.
Taiwan Search Report—TW097139078—TIPO—Mar. 28, 2012.
European Search Report—EP08006538—Search Authority—Munich—Sep. 23, 2009.
Richardson, I. et al., "H.264 and MPEG-4 Video Compression", Moscow: Tekhnosfera, 2005, p. 240-244.

* cited by examiner

UNIVERSAL BLOCKINESS CORRECTION

FIELD

The present disclosure relates generally to the field of image processing and, more specifically, to techniques for universally correcting blockiness with a low million instructions per second (MIPs).

BACKGROUND

Blockiness is one of the most noticeable artifacts introduced by block-based video and image coding. The reasons behind the blockiness is that the block-based coding uses a block (e.g. 8×8 or 4×4) as a basic unit, for transformation, quantization and texture coding, and the inter-block correlation, is lost during this coding. The problem is especially severe when video/image content is coded at very low bit rates (high quantization step size qp). For intra macroblocks (MBs), the blocking artifacts are visible only around block boundaries. However for inter MBs, the motion compensation may bring the artifacts inside the blocks. The blocking artifacts coming from the reference frames is termed "inherited blockiness" because the blockiness is inherited from previous frames. The inherited blockiness may be visible at any location and have any length.

There are two types of approaches to address the inherited blockiness issue. A first approach is to exploit long-tap filtering on all pixels in order to smooth out artifacts because the inherited blockiness may appear anywhere. The first approach employs the DC offset mode defined in the motion picture expert group (MPEG)-4 standard, in which a 9-tap filtering is applied on all eight neighboring pixels around a block edge. The second approach traces the moving trajectory of the blockiness and applies DB on the moved artifacts.

The second approach has been proved to be an effective tool to remove inherited blockiness, the MIPs requirement for deblocking a 30 frames per second (fps) VGA image is too high for mobile or wireless applications.

Using a H.264 hardware deblocker (DB) as a post-loop deblocker for MPEG-4 and Wireless Media Video 9 series (WMV9) is known. However, in the past, the post-loop deblocker only filters the pixels around 8×8 blocks, so the inherited blockiness still remains. Furthermore, the filtering strength, for skipped MBs and coded block pattern (CBP) 0 blocks, is not strong enough. The standard practice always sets BS for an inter MB as two or less (unless the neighboring MB is of intra).

There is therefore a need for techniques to universally correct blockiness, including inherited blockiness, with a low million instructions per second (MIPs).

SUMMARY

Techniques to universally correct blockiness with a low million instructions per second (MIPs) are described herein. In one configuration, a device comprising a processor operative to implement a set of instructions to commandeer an in-loop deblocking filtering engine and to universally correct blockiness in a decoded output signal during a post-loop filtering operation using the in-loop deblocking filtering engine is provided. The device also includes a memory coupled to the processor.

In another aspect, an integrated circuit comprising a decoder having an in-loop deblocking filtering engine is provided. The integrated circuit also includes a processor operative to implement a set of instructions to commandeer the in-loop deblocking filtering engine and to universally correct blockiness in a decoded output signal during a post-loop filtering operation using the in-loop deblocking filtering engine. The integrated circuit further includes a memory coupled to the processor.

In a still further aspect, a computer program product including a computer readable medium having instructions for causing a computer to commandeer an in-loop deblocking filtering engine is provided. The instructions further cause the computer to universally correct blockiness in a decoded output signal during a post-loop filtering operation using the in-loop deblocking filtering engine.

Additional aspects will become more readily apparent from the detailed description, particularly when taken together with the appended drawings.

BRIEF DESCRIPTION OF THE DRAWINGS

Aspects and configurations of the disclosure will become more apparent from the detailed description set forth below when taken in conjunction with the drawings in which like reference characters identify corresponding elements throughout.

Figure 1:
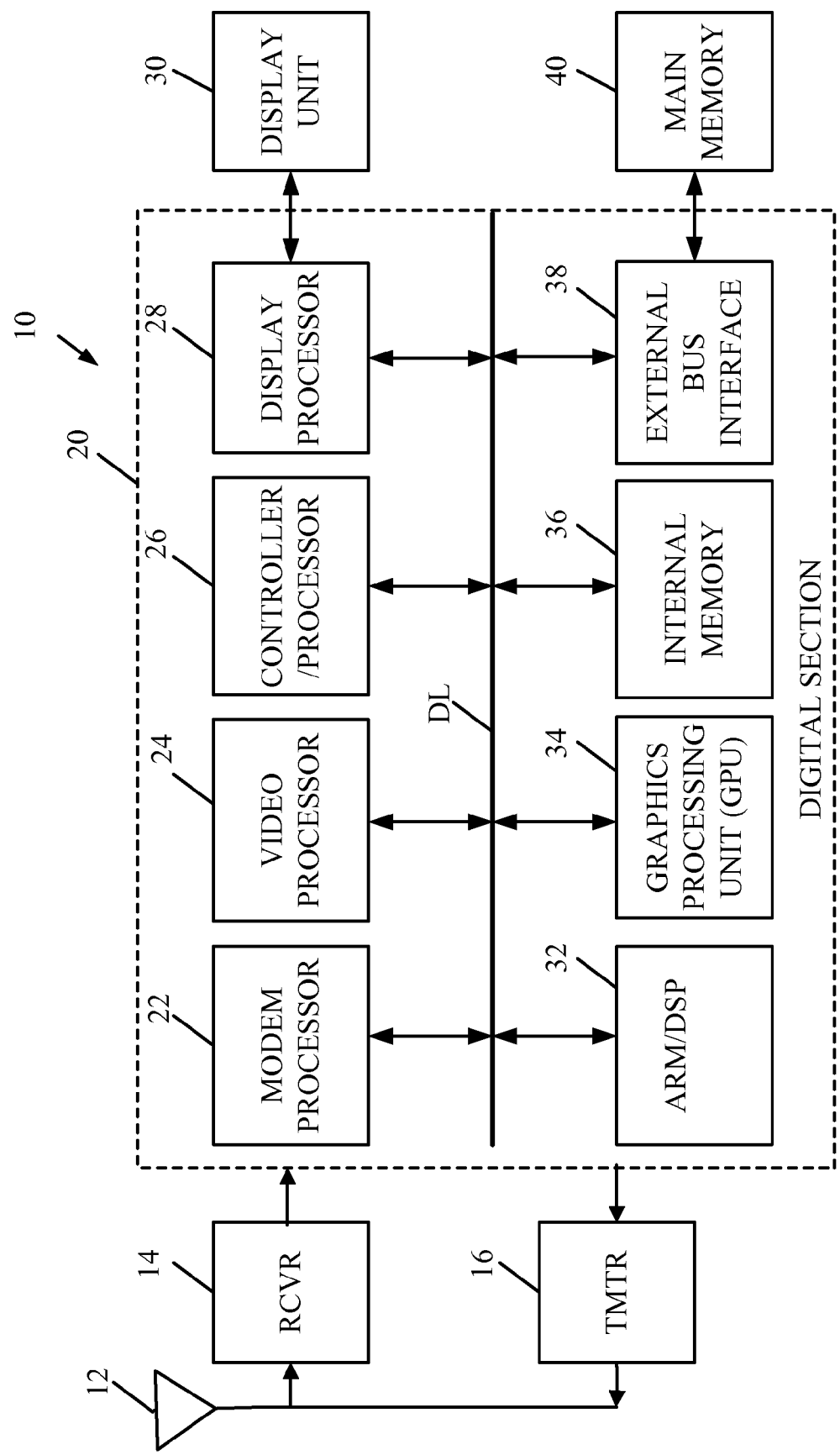
FIG. 1 shows a block diagram of a wireless device.

The images in the drawings are simplified for illustrative purposes and are not depicted to scale. To facilitate understanding, identical reference numerals have been used, where possible, to designate identical elements that are common to the figures, except that suffixes may be added, when appropriate, to differentiate such elements.

The appended drawings illustrate exemplary configurations of the invention and, as such, should not be considered as limiting the scope of the invention that may admit to other equally effective configurations. It is contemplated that features or steps of one configuration may be beneficially incorporated in other configurations without further recitation.

DETAILED DESCRIPTION

The word "exemplary" is used herein to mean "serving as an example, instance, or illustration." Any configuration or design described herein as "exemplary" is not necessarily to be construed as preferred or advantageous over other configurations or designs, and the terms "core", "engine", "machine", "processor" and "processing unit" are used interchangeably.

The techniques described herein may be used for wireless communications, computing, personal electronics, etc. An exemplary use of the techniques for wireless communication is described below.

FIG. 1 shows a block diagram of a configuration of a wireless device 10 in a wireless communication system. The wireless device 10 may be a handset. The handset may be a cellular or camera phone, a terminal, a wirelessly-equipped personal digital assistant (PDA), a wireless communications device, a video game console, a laptop computer, a video-enabled device or some other wirelessly-equipped device. The wireless communication system may be a Code Division Multiple Access (CDMA) system, a Global System for Mobile Communications (GSM) system, or some other system.

The wireless device 10 is capable of providing bi-directional communications via a receive path and a transmit path. On the receive path, signals transmitted by base stations are received by an antenna 12 and provided to a receiver (RCVR) 14. The receiver 14 conditions and digitizes the received signal and provides samples to a digital section 20 for further processing. On the transmit path, a transmitter (TMTR) 16 receives data to be transmitted from the digital section 20, processes and conditions the data, and generates a modulated signal, which is transmitted via the antenna 12 to the base stations.

The digital section 20 includes various processing, interface and memory units such as, for example, a modem processor 22, a video processor 24, a controller/processor 26, a display processor 28, an ARM/DSP 32, a graphics processing unit (GPU) 34, an internal memory 36, and an external bus interface (EBI) 38. The modem processor 22 performs processing for data transmission and reception (e.g., encoding, modulation, demodulation, and decoding). The video processor 24 performs processing on video content (e.g., still images, moving videos, and moving texts) for video applications such as camcorder, video playback, and video conferencing. The controller/processor 26 may direct the operation of various processing and interface units within digital section 20. The display processor 28 performs processing to facilitate the display of videos, graphics, and texts on a display unit 30. The ARM/DSP 32 may perform various types of processing for the wireless device 10. The graphics processing unit 34 performs graphics processing.

The techniques described herein may be used for any of the processors in the digital section 20, e.g., the video processor 24. The internal memory 36 stores data and/or instructions for various units within the digital section 20. The EBI 38 facilitates the transfer of data between the digital section 20 (e.g., internal memory 36) and a main memory 40 along a bus or data line DL.

The digital section 20 may be implemented with one or more DSPs, micro-processors, RISCs, etc. The digital section 20 may also be fabricated on one or more application specific integrated circuits (ASICs) or some other type of integrated circuits (ICs).

The techniques described herein may be implemented in various hardware units. For example, the techniques may be implemented in ASICs, DSPs, RISCs, ARMs, digital signal processing devices (DSPDs), programmable logic devices (PLDs), field programmable gate arrays (FPGAs), processors, controllers, micro-controllers, microprocessors, and other electronic units.

Furthermore, the techniques described herein to remove blockiness/artifacts introduced by video coding can be used for MPEG-4, H.263, WMV9 and H.264 standards. As can be seen from the description below, the advantage of these techniques is that annoying inherited artifacts are removed at a very low cost such as 2.5-4 million instructions per second (MIPs). The requirements for the new post-loop de-artifact/blocker (DAB) apparatus 70 for a low complexity configuration with almost 0% CPU usage for an ARM and reasonable DSP MIPs can be achieved with no module put in an ARM, and with no pixel access. Moreover, the real filtering is performed in DSP.

In the exemplary configuration, the only filter used is the H.264 in-loop deblocker (DB) because it is built in hardware (HW). The exemplary configuration requires new boundary strength (BS) calculations in addition to the FilterOffsetA and FilterOffsetB (FIG. 2A) defined in H.264 standard.

Figure 2A:
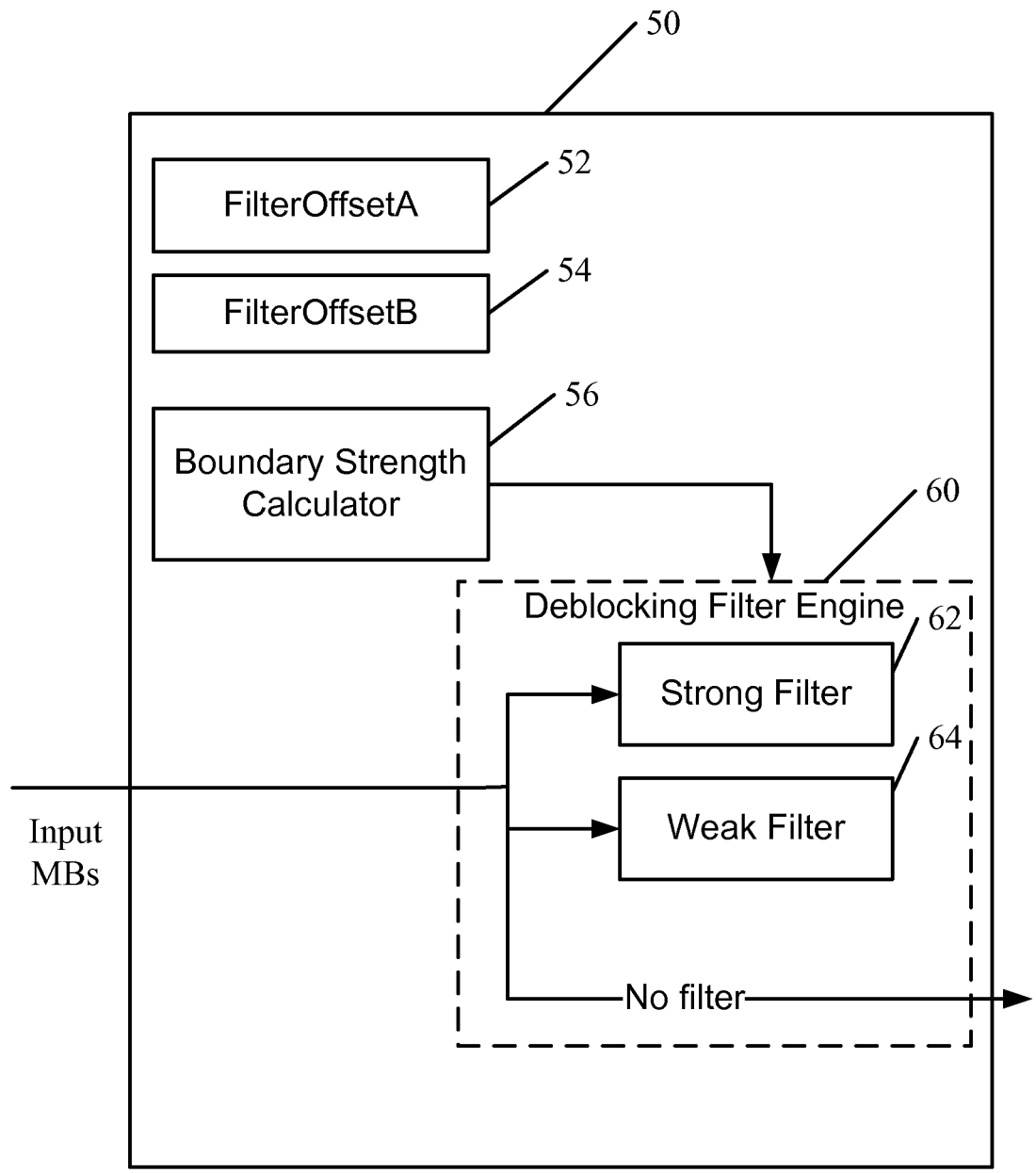
FIG. 2A shows a general block diagram of a H264 in-loop deblocker.

FIG. 2A shows a general block diagram of a conventional in-loop deblocker 50. There are two types of filtering operations defined in the H.264 standard for the in-loop DB 50. A deblocking filter engine 60 is controlled to perform the two types of filtering operations. One filtering type is a strong filtering operation (referring to BS=4) by a strong filter 62 in the filter engine 60. The second filtering type is a weak filtering operation (referring to BS=1, 2 or 3) by a weak filter 64 in the deblocking filter engine 60. When the BS is equal to 4, a 4-tap or 5-tap filtering is applied on up to 6 luma pixels around an edge of a "tile" via the strong filter 62. The two types of filtering operations is also a function of FilterOffsetA 52 and FilterOffsetB 54. The in-loop DB 50 receives as input MBs which are filtered by the deblocking filter engine 60 in the manner as described above. The in-loop DB 50 also includes a boundary strength calculator 56 which calculates the boundary strength (BS) for the MBs. The deblocking filter engine 60 is shown in a dashed line to denote that part of the in-loop DB 50 which is in hardware. The FilterOffsetA 52, FilterOffsetB 54 and boundary strength calculator 56 may be firmware, software or a combination thereof.

For clarity, a tile is defined herein to prevent any confusion brought by different definitions for a "block" in different standards. In this disclosure, a tile is defined as a 4×4 non-overlap square and a block is defined as an 8×8 non-overlapped square.

Figure 3:
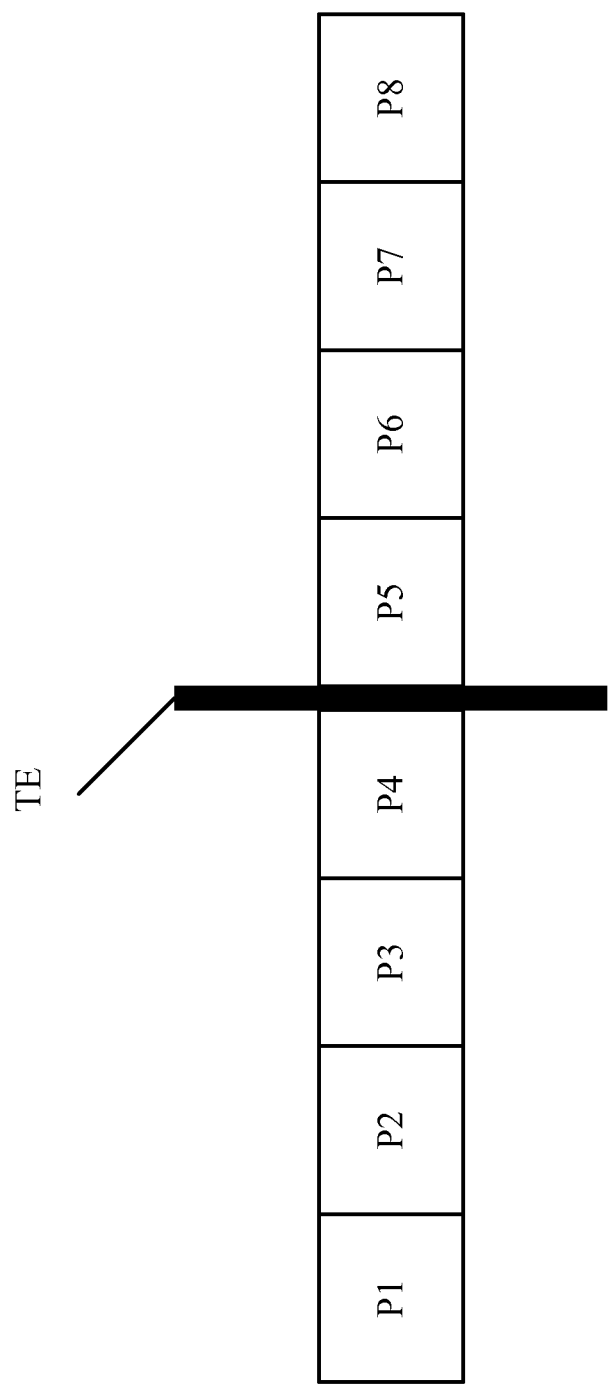
FIG. 3 shows the pixel locations for a tile edge.

FIG. 3 shows the pixel locations for a tile edge TE. The tile edge TE has pixels $P_1$-$P_4$ on the left-hand side. The tile edge TE has pixels $P_5$-$P_8$ on the right-hand side. The strong filtering operation (BS=4) for a luma tile edge is listed in Table 1 below, where the table entry value indicates the number of filtering taps for pixels $P_1$-$P_8$. The number zero (0) denotes no filter taps and thus no filtering.

To prevent blur of the true edges, three spatial activity checking conditions, defined in equations Eq. (1)-(3) are specified in the H.264 standard to make a filtering decision. The H.264 standard assumes that the blockiness has a weaker amplitude difference than a true edge. Hence, more taps of filtering on more pixels are performed when all the three conditions hold true as set forth in equations Eq. (1)-(3).

$$|P_5 - P_4| < Thd1(qp, FilterOffsetA), \qquad (1)$$

$$|P_4 - P_2| < Thd2(qp, FilterOffsetB), \text{ and} \qquad (2)$$

$$|P_7 - P_5| < Thd2(qp, FilterOffsetB), \qquad (3)$$

where $P_2$, $P_4$, $P_5$ and $P_7$ are pixels; qp is the quantization step size; FilterOffsetA is a pre-defined constant to adjust Thd1; FilterOffsetB is a pre-defined constant to adjust Thd2; Thd1 is a threshold value for a corresponding qp and FilterOffsetA; and Thd2 is a threshold value for a corresponding qp and FilterOffsetB. The values of FilterOffsetA and FilterOffsetB affect Thd1 and Thd2 and thus affect the pixels to be filtered.

For chroma, only two pixels (e.g., $P_4$ and $P_5$) are modified by a 3-tap filtering.

TABLE 1

BS = 4 filtering operations for a luma tile edge.

| CONDITION | $P_1$ | $P_2$ | $P_3$ | $P_4$ | $P_5$ | $P_6$ | $P_7$ | $P_8$ |
|---|---|---|---|---|---|---|---|---|
| (1) or (2) is false And (1) or (3) is false | 0 | 0 | 0 | 3 | 3 | 0 | 0 | 0 |
| (1) and (3) hold true (2) is false | 0 | 0 | 0 | 3 | 5 | 4 | 5 | 0 |
| (2) and (3) hold true (1) is false | 0 | 5 | 4 | 5 | 3 | 0 | 0 | 0 |
| (1) and (2) and (3) are all true | 0 | 5 | 4 | 5 | 5 | 4 | 5 | 0 |

The weak filtering operation (referring to BS=1, 2 and 3) modifies up to 4 luma pixels and up to 2 chroma pixels for a tile edge, as described in Table 2. In Table 2, the symbol Y denotes filtering and N denotes no filtering.

TABLE 2

BS = 1, 2 OR 3 filtering operations for a tile edge.

| CONDITION | $P_1$ | $P_2$ | $P_3$ | $P_4$ | $P_5$ | $P_6$ | $P_7$ | $P_8$ |
|---|---|---|---|---|---|---|---|---|
| Chroma or Both (2) and (3) are false | N | N | N | Y | Y | N | N | N |
| (3) Holds true (2) is false | N | N | N | Y | Y | Y | N | N |
| (2) hold strue (3) is false | N | N | Y | Y | Y | N | N | N |
| Both (2) and (3) are true | N | N | Y | Y | Y | Y | N | N |

Figure 4A:
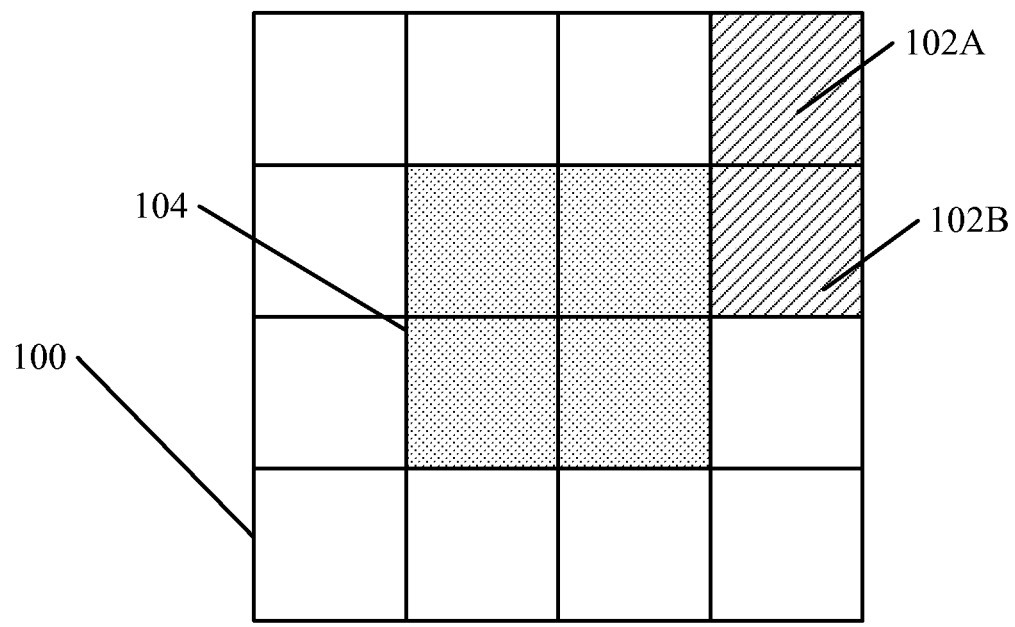
FIG. 4A shows a reference macroblock frame with blockiness.

FIG. 4A shows a reference macroblock frame 100 with blockiness. The blockiness is denoted by cross-hatched squares 102A and 102B. The reference tile 104 is shown shaded in the center of the frame 100.

Figure 4B:
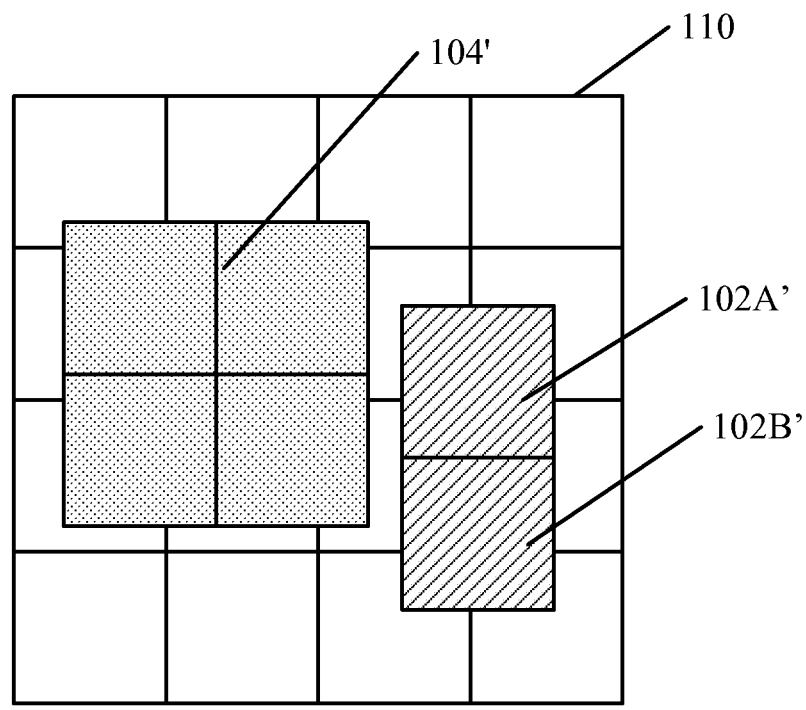
FIG. 4B shows a next macroblock frame with inherited blockiness of FIG. 4A.

FIG. 4B shows a next macroblock frame 110 with inherited blockiness of FIG. 4A. The inherited blockiness is denoted by cross-hatched squares 102A' and 102B'. The tile 104' is shown shifted from the center of the frame 110. The inherited blockiness is also shifted.

Figure 5A:
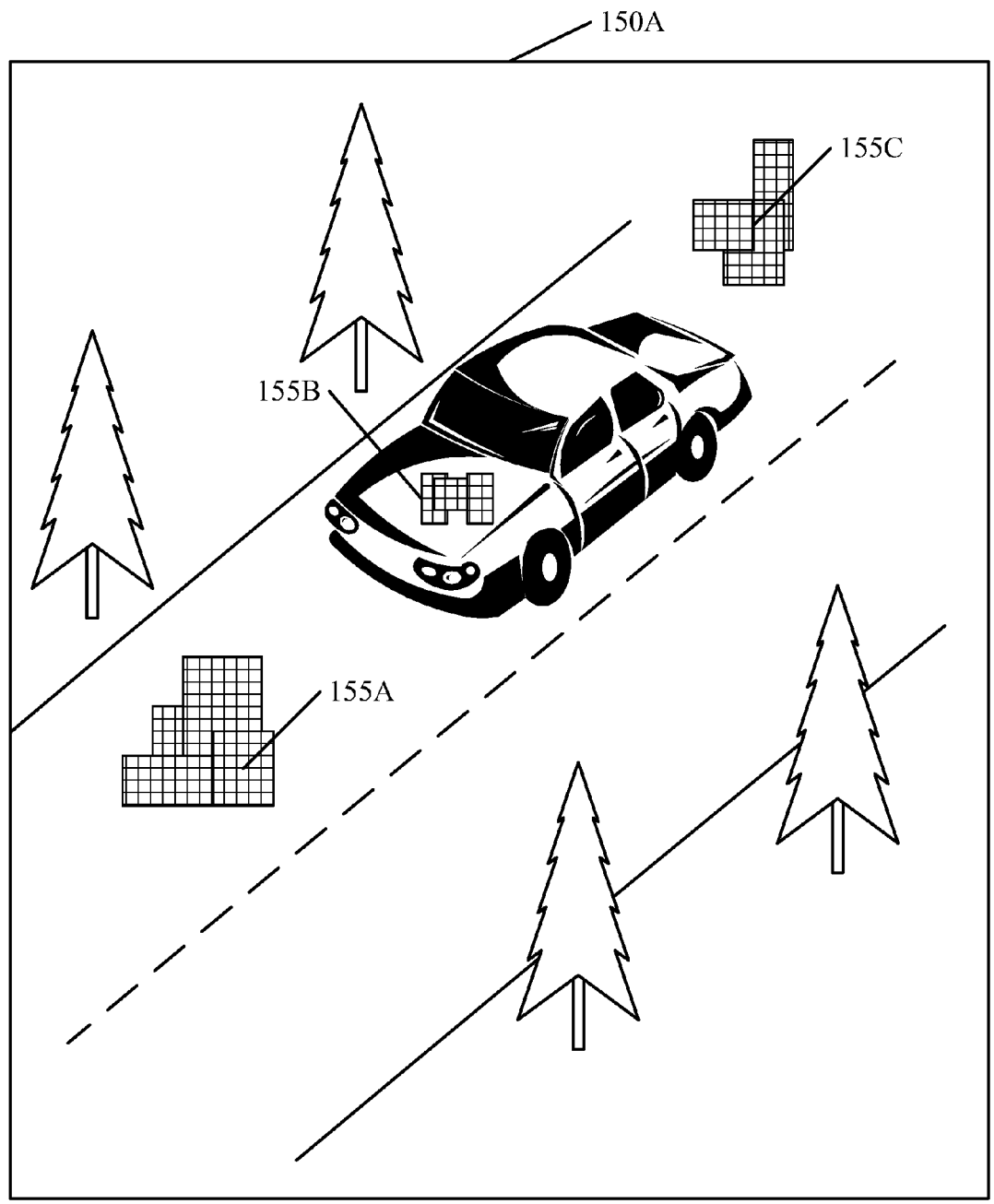
FIG. 5A shows inherited blockiness in an image.

FIG. 5A shows an example of inherited blockiness in an image 150A. The area denoted as 155A, 155B and 155C represent areas of inherited blockiness created by block-based video and image coding.

Figure 2B:
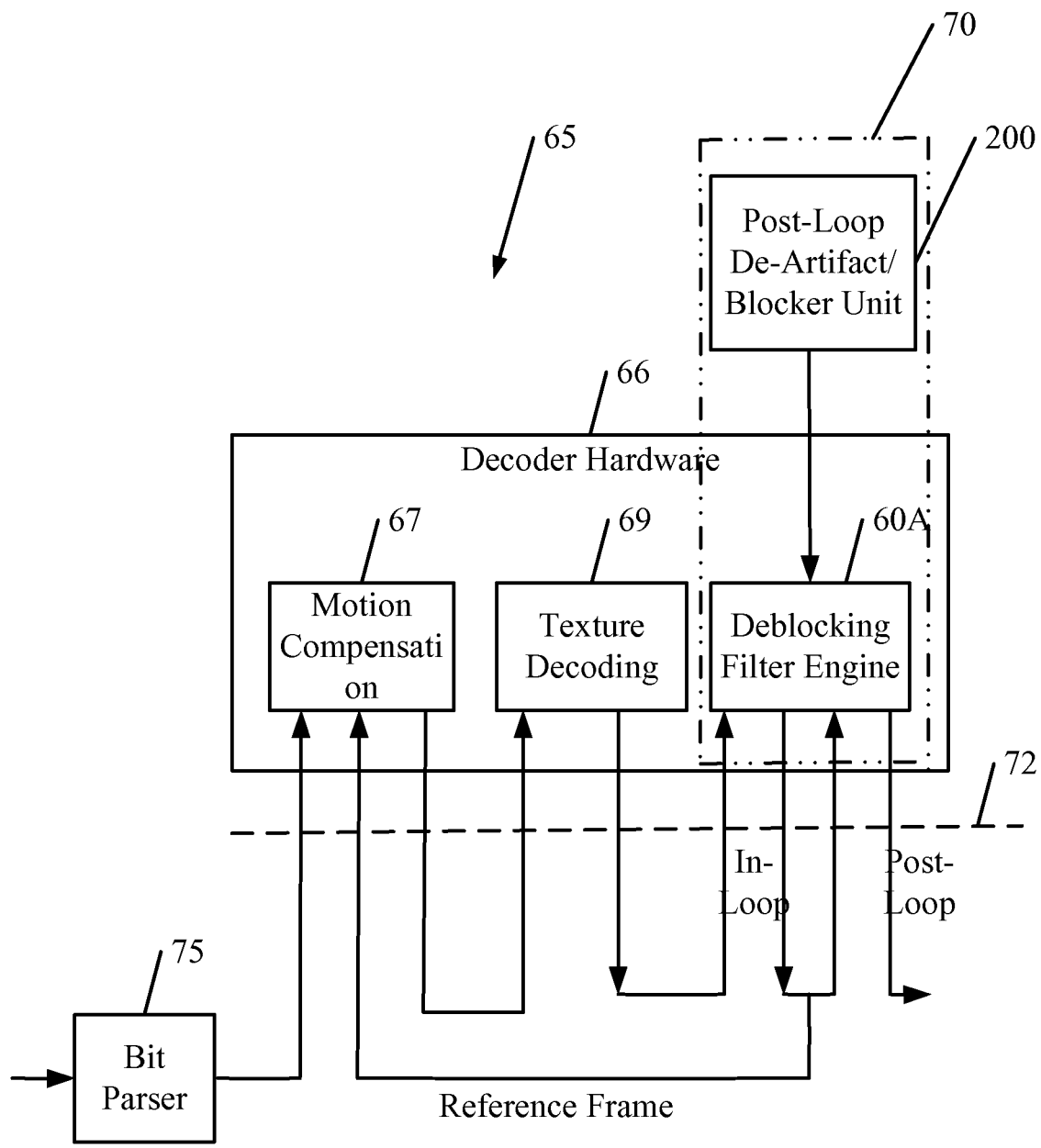
FIG. 2B shows a general block diagram of a decoder with a post-loop de-artifact/blocker (DAB) apparatus sharing an in-loop deblocking filter engine.

FIG. 2B shows a general block diagram of a decoder 65 with a post-loop de-artifact/blocker (DAB) apparatus 70 sharing an in-loop deblocking filter engine 60A. The DAB apparatus 70 includes a post-loop DAB unit 200 which interfaces with and commandeers the in-loop deblocking filter engine 60A for universally correcting blockiness. In general, the post-loop DAB unit 200 provides a new BS calculation scheme for controlling the filter engine 60A, as will be described in more detail below.

For illustrative purposes, the decoder 65 includes a decoder hardware portion 66 and a firmware, software, or a combination thereof portion for decoding input signals. The decoder hardware portion 66 of a decoder 65 includes a motion compensation module 67 and a texture decoding module 69. The motion compensation module 67 receives a data stream as input from a bit parser 75 and receives a reference frame from the in-loop deblocking filter engine 60A during in-loop filtering operations. The motion compensation module 67 also generates an output signal which is sent to the texture decoding module 69. The texture decoding module 69 in turn generates an output signal which is sent to the in-loop deblocking filter engine 60A. The in-loop deblocking filter engine 60A produces a filtered output which includes a reference frame for input to the motion compensation module 67 and a filtered output (hereinafter referred to as the "in-loop filtered output"). The dashed line denoted as 72 includes the software, firmware or a combination thereof for performing decoding operations in accordance with a codec procedure.

During the post-loop DAB filtering operations, the post-loop de-artifact/blocker (DAB) apparatus 70 commandeers the in-loop deblocking filter engine 60A wherein the in-loop filtered output is cycled back through the in-loop deblocking filter engine 60A for post-loop filtering operations under the control of the post-loop DAB unit 200, described later in detail.

Post-loop filtering occurs after the decoder (decoding) and the filtered frames are not used as reference frames for the decoder 65. Since the post-loop filtering is not defined in the codec standards, one has freedom to design its own filter. If the in-loop filtering operations are part of the decoder 65, such operations need to be completely compliant with the codec standards.

Figure 2C:
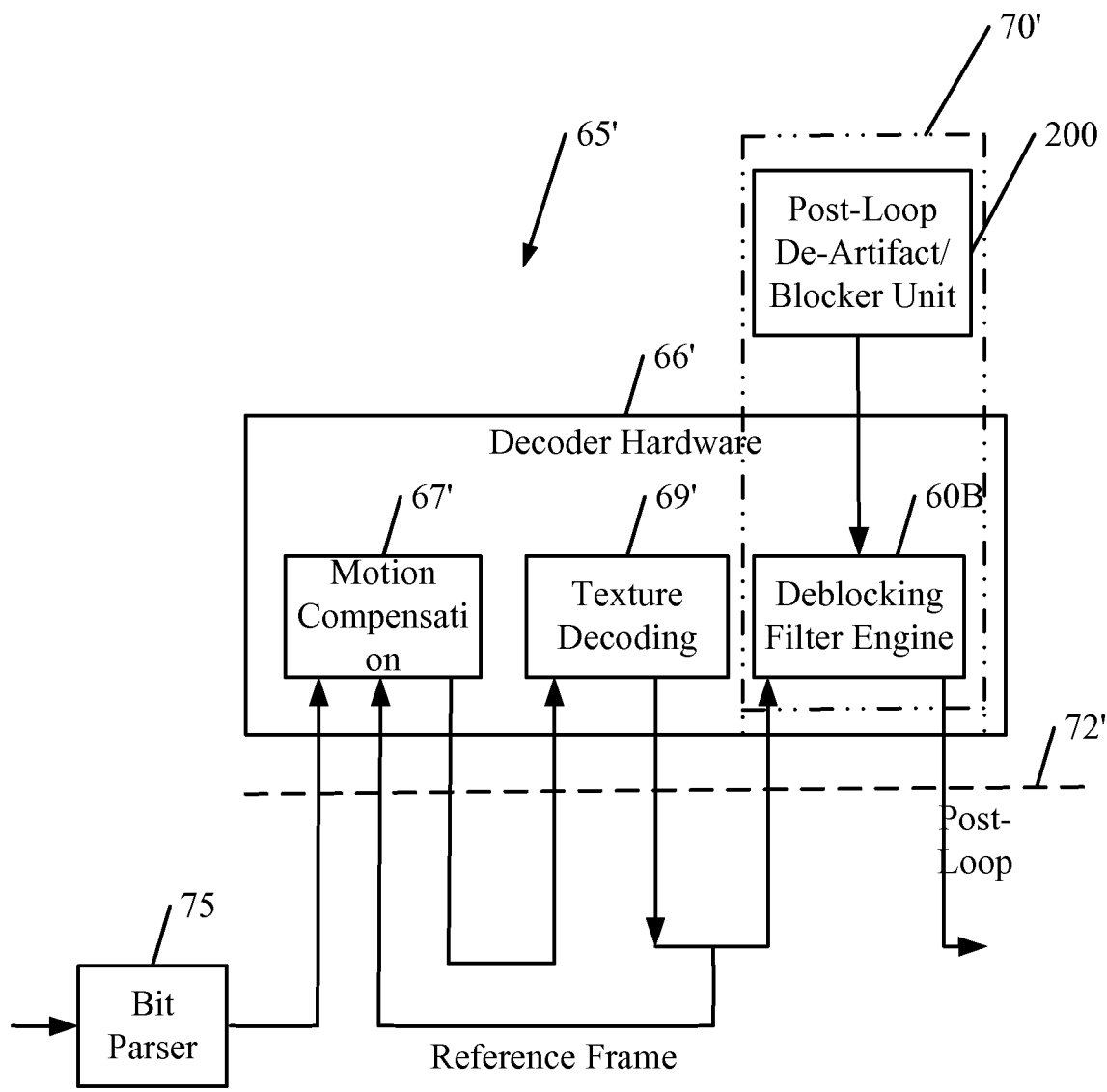
FIG. 2C shows a general block diagram of a decoder with a post-loop de-artifact/blocker (DAB) apparatus.

FIG. 2C shows a general block diagram of a decoder 65' with a post-loop de-artifact/blocker (DAB) apparatus 70'. Some codecs, such as MPEG4 and H263P0, do not support in-loop deblocking. In some instances, the decoder hardware portion 66' is still equipped with an in-loop deblocking filter engines 60B. Thus, in this case, in-loop deblocking filter engine 60B of decoder 65' is not employed to perform in-loop deblocking. Instead, the in-loop deblocking filter engine 60B may sit idle. The DAB apparatus 70' includes a post-loop DAB unit 200 which interfaces with and commandeers the in-loop deblocking filter engine 60B for universally correcting blockiness. In general, the post-loop DAB unit 200 provides a new BS calculation scheme for controlling the filter engine 60B.

For illustrative purposes, the decoder 65' includes a decoder hardware portion 66' and a firmware, software, or a combination thereof portion for decoding input signals. The decoder hardware portion 66' of a decoder 65' includes a motion compensation module 67' and a texture decoding module 69'. The motion compensation module 67' receives a data stream as input from a bit parser 75 and receives a reference frame from the texture decoding module 69' during decoding operations. The motion compensation module 67' also generates an output signal which is sent to the texture decoding module 69'. The texture decoding module 69' generates a decoded output signal. The dashed line denoted as 72' includes the software, firmware or a combination thereof for performing decoding operations in accordance with a codec procedure without in-loop filtering.

During the post-loop DAB filtering operations, the post-loop de-artifact/blocker (DAB) apparatus 70' commandeers the in-loop deblocking filter engine 60B wherein the decoded output signal of the texture decoding module 69' is cycled through the in-loop deblocking filter engine 60B for post-loop filtering operations under the control of the post-loop DAB unit 200.

Figure 5B:
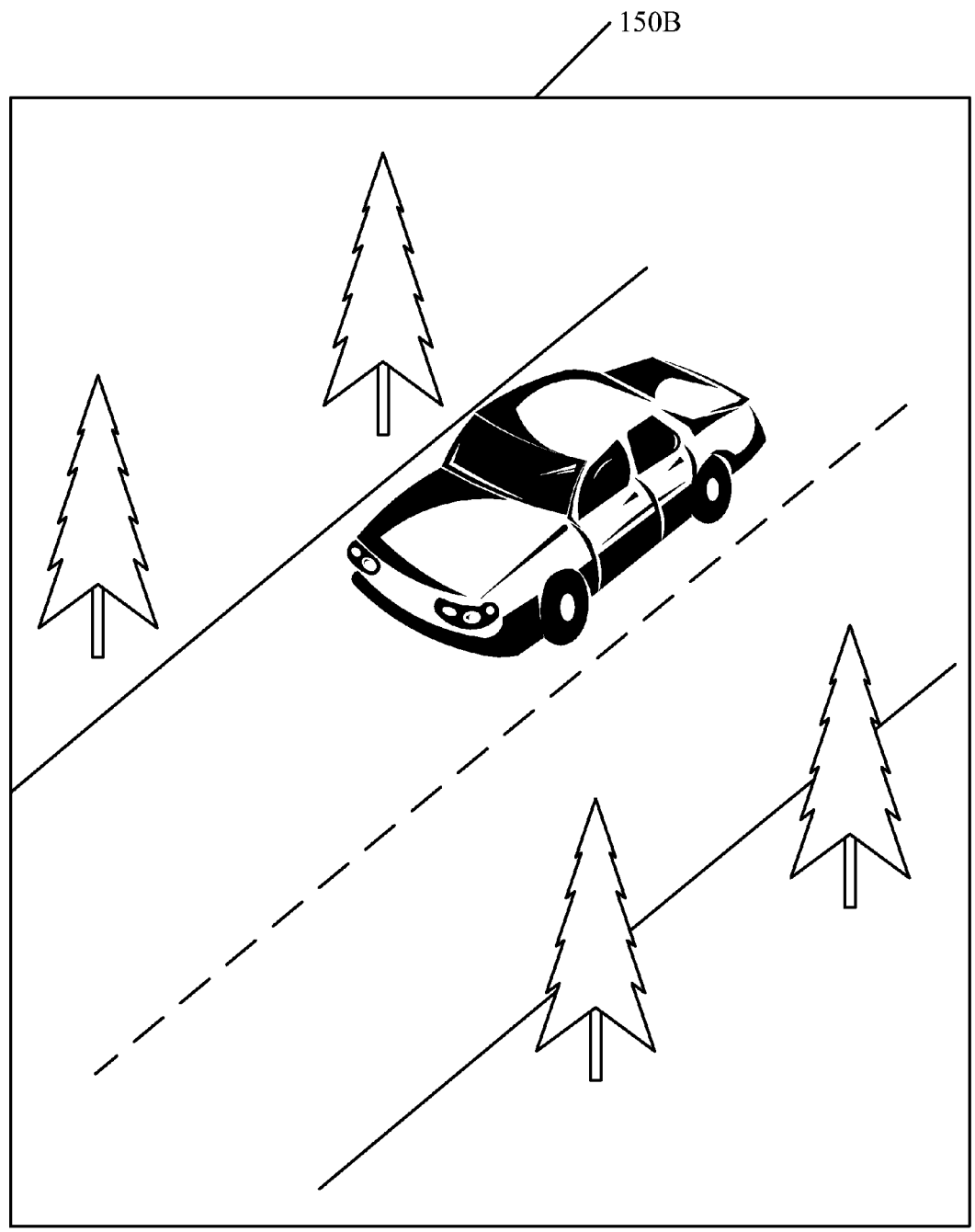
FIG. 5B shows an image without inherited blockiness.

FIG. 5B shows an image 150B without inherited blockiness using the new BS calculation scheme from the post-loop DAB apparatus 70.

Figure 6:
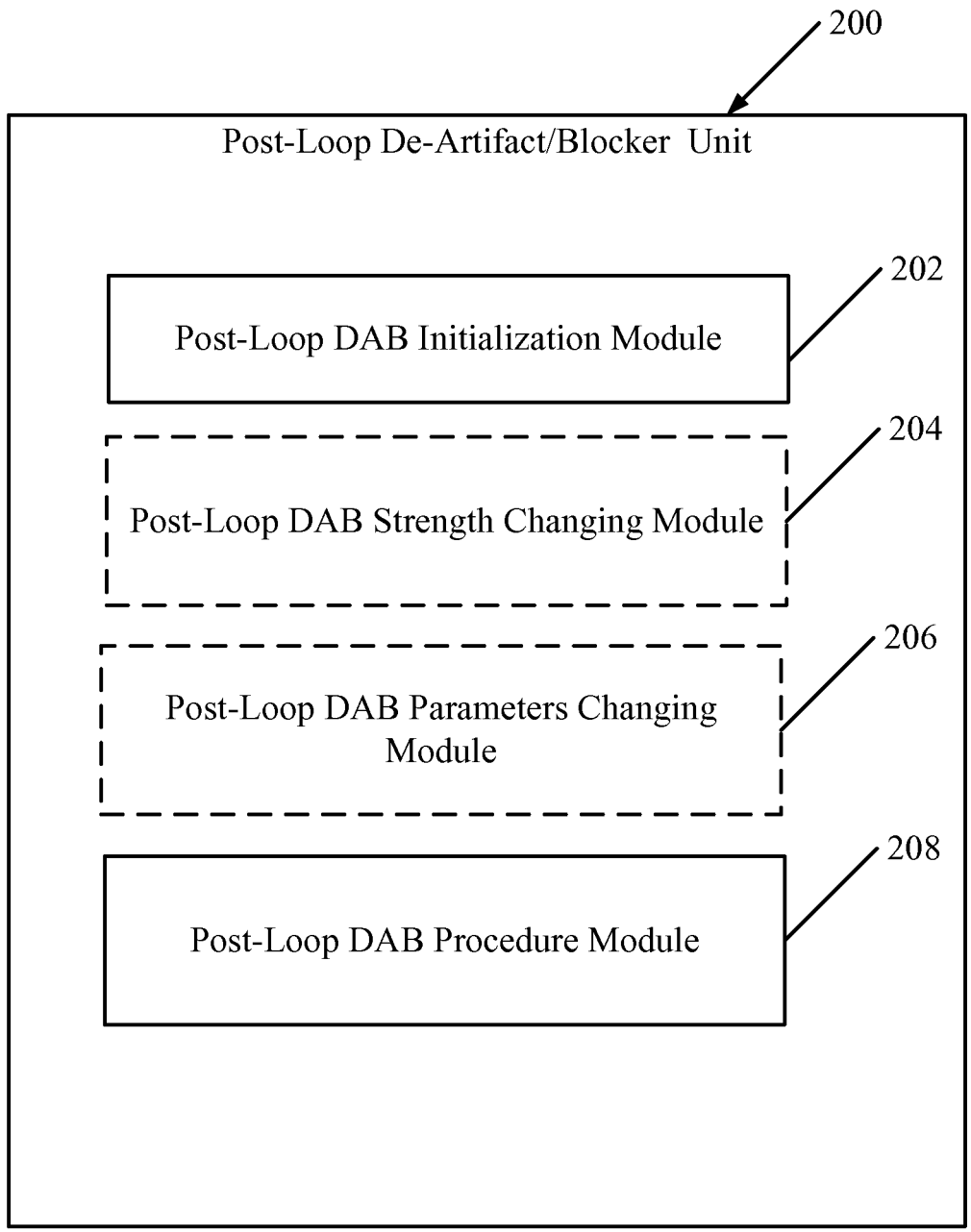
FIG. 6 shows a post-loop de-artifact/blocker (DAB) unit.

FIG. 6 shows a post-loop de-artifact/blocker (DAB) unit 200. The DAB unit 200 includes a post-loop DAB initialization module 202, a post-loop DAB strength changing module 204, a post-loop DAB parameters changing module 206, and a post-loop DAB procedure module 208. The post-loop DAB unit 200 may be a standalone unit. The post-loop DAB initialization module 202, a post-loop DAB strength changing module 204, a post-loop DAB parameters changing module 206, and a post-loop DAB procedure module 208 provide four application programming interfaces (API) to external users.

Figure 7:
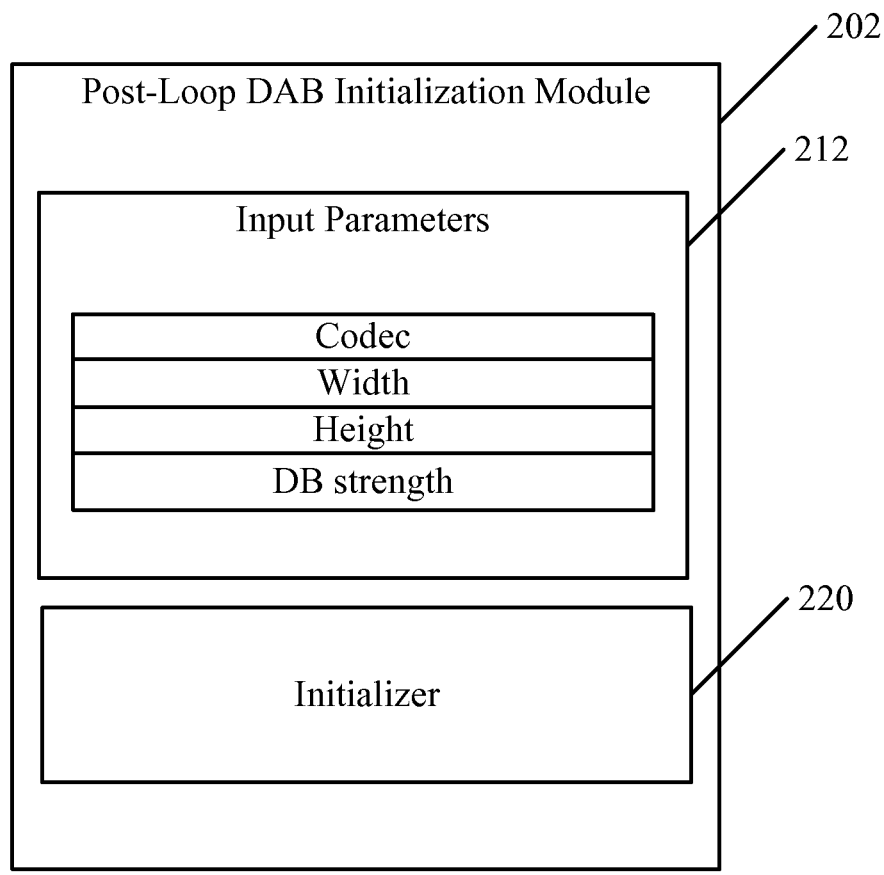
FIG. 7 shows a post-loop DAB initialization module.

FIG. 7 shows a post-loop DAB initialization module 202. The post-loop DAB initialization module 202 is generally needed only once at the beginning or installation. The post-loop DAB initialization module 202 has four input parameters 212. The input parameters 212 include codec, width, height and DB_strength. The post-loop DAB initialization module 202 also includes an initializer 220 to initialize the operations for the post-loop de-artifact/blocker (DAB) unit 200 and DAB apparatus 70. Based on the type of codec entered, the post-loop DAB initialization module 202 initializes the operations for a specific codec such as without limitation, a codec with an in-loop DB 50 or without an in-loop DB 50, etc. This allows the post-loop de-artifact/blocker (DAB) unit 200 to universally adapt to various decoders 65 or 65'.

Figure 8:
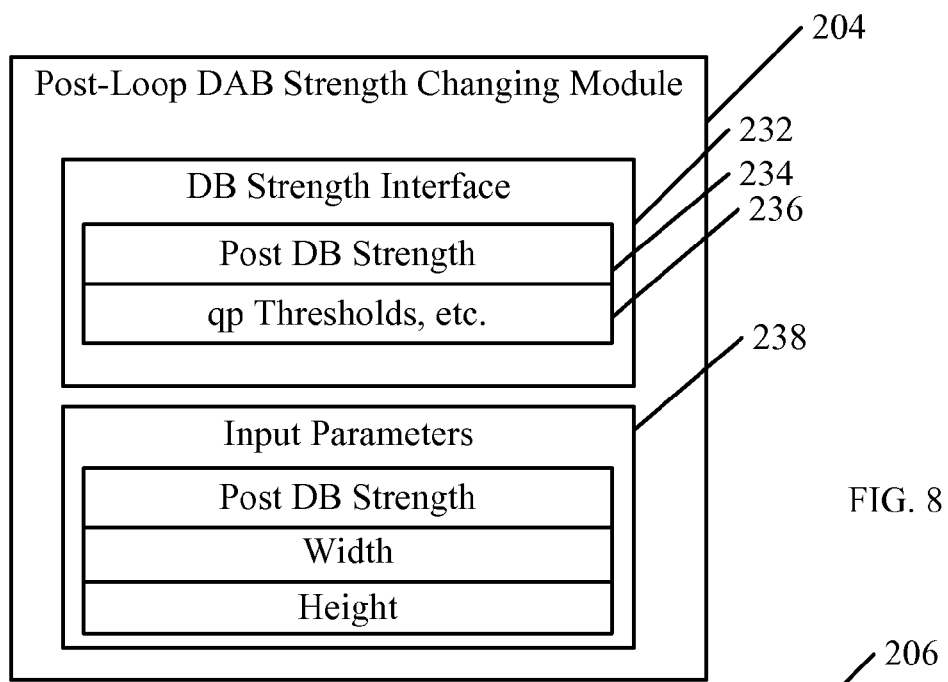
FIG. 8 shows a post-loop DAB strength changing module.

FIG. 8 shows a post-loop DAB strength changing module 204. The post-loop DAB strength changing module 204 allows users to change the boundary strength (BS) used by the post-loop DAB unit 200 to control the operations of the in-loop deblocking filter engine 60A or 60B for post-loop operations. The post-loop DAB strength changing module 204 includes a DB strength interface 232 for changing the post_db_strength and the DAB input parameters 236 such as the qp threshold, etc. Furthermore, the post-loop DAB parameters (FIG. 9) are modified accordingly. The post-loop DAB strength changing module 204 has a plurality of input parameters 238 which includes post_db_strength, width and height.

Figure 9:
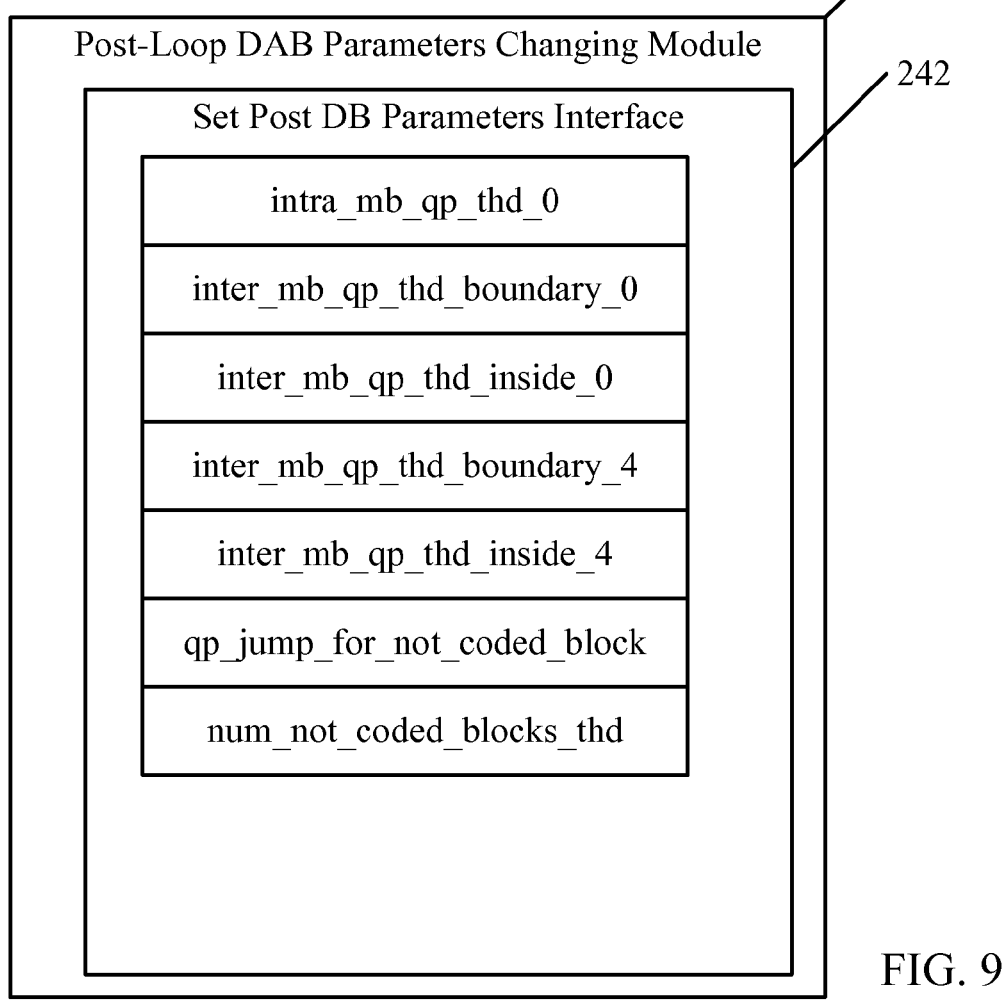
FIG. 9 shows a post-loop DAB parameters changing module.

FIG. 9 shows a post-loop DAB parameters changing module 206. The post-loop DAB parameters changing module 206 is an alternate way to change the post-loop DAB parameters. The post-loop DAB boundary strength changing module 230 derives the DAB parameters through the post_db_strength. However, the post-loop DAB parameters changing module 240 allows users to set the DAB parameters directly.

Figures 15, 16:
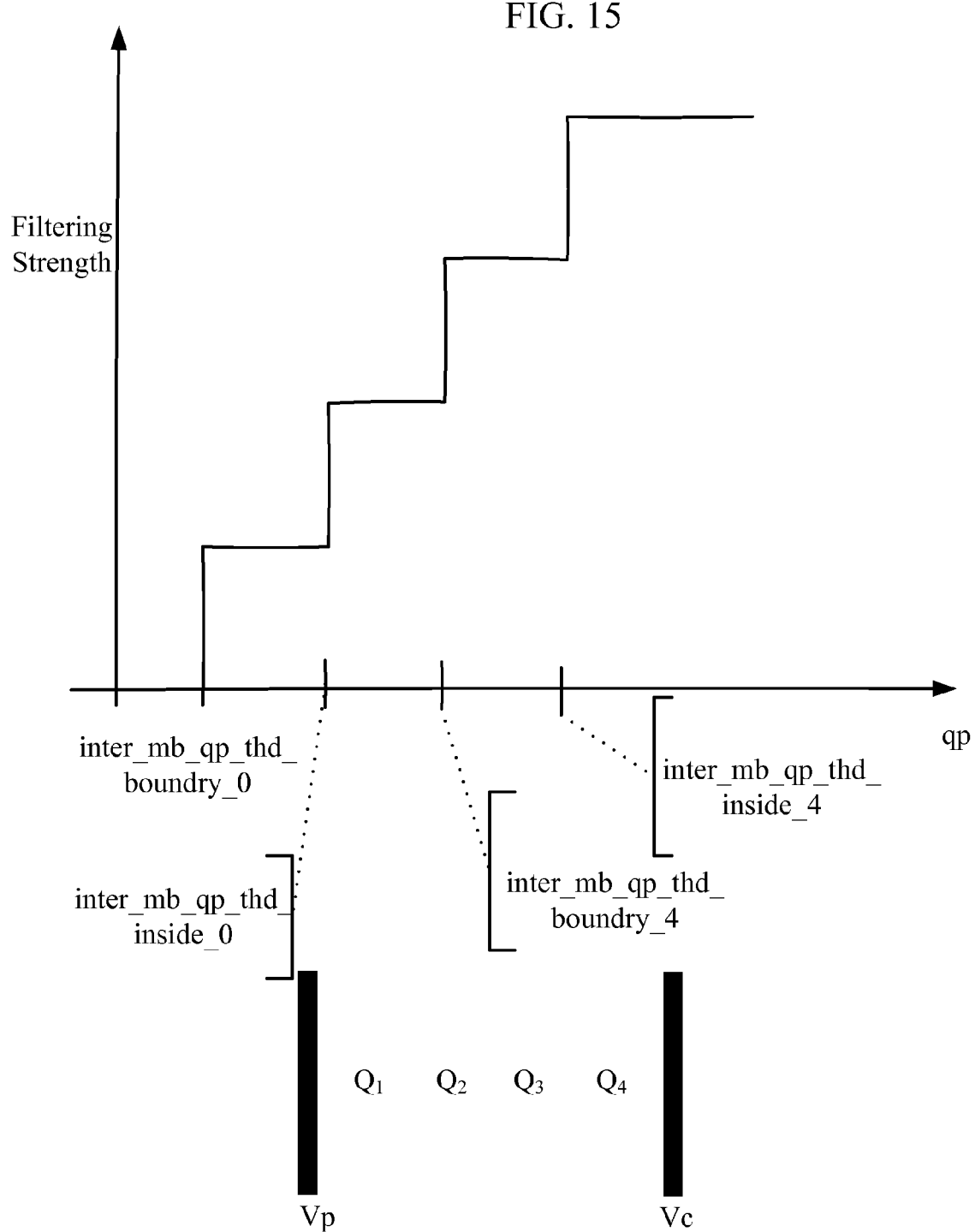
FIG. 15 shows a graph of a qp-filtering strength relationship for inter MBs.
FIG. 16 shows an exemplary relationship between a current tile edge and a previous tile edge.

The post-loop DAB parameters changing module 204 includes a set post-loop DAB parameters interface 242 to provide setting of a plurality of DAB parameters. The plurality of DAB parameter includes a plurality of qp thresholds. The qp thresholds include intra_mb_qp_thd_0, inter_mb_qp_thd_boundary_0, inter_mb_qp_thd_inside_0, inter_mb_qp_thd_boundary_4, inter_mb_qp_thd_inside_4. Additional parameters include qp_jump_for_not_coded_block and num_not_coded_blocks_thd. Both the post-loop DAB strength changing module 204 and the post-loop DAB parameters changing module 206 are optional denoted by the dotted boxes in FIG. 6. The relationship between the qp thresholds and the filtering strength is shown in FIG. 15.

The qp thresholds are tunable. The single parameter "post_db_strength" controls all five qp thresholds. A small post_db_strength is associated with larger qp thresholds, which raises the bar to do filtering. In the exemplary configuration, the parameter post_db_strength ranges from 0 to 20 and 14 is a default value.

Figure 10:
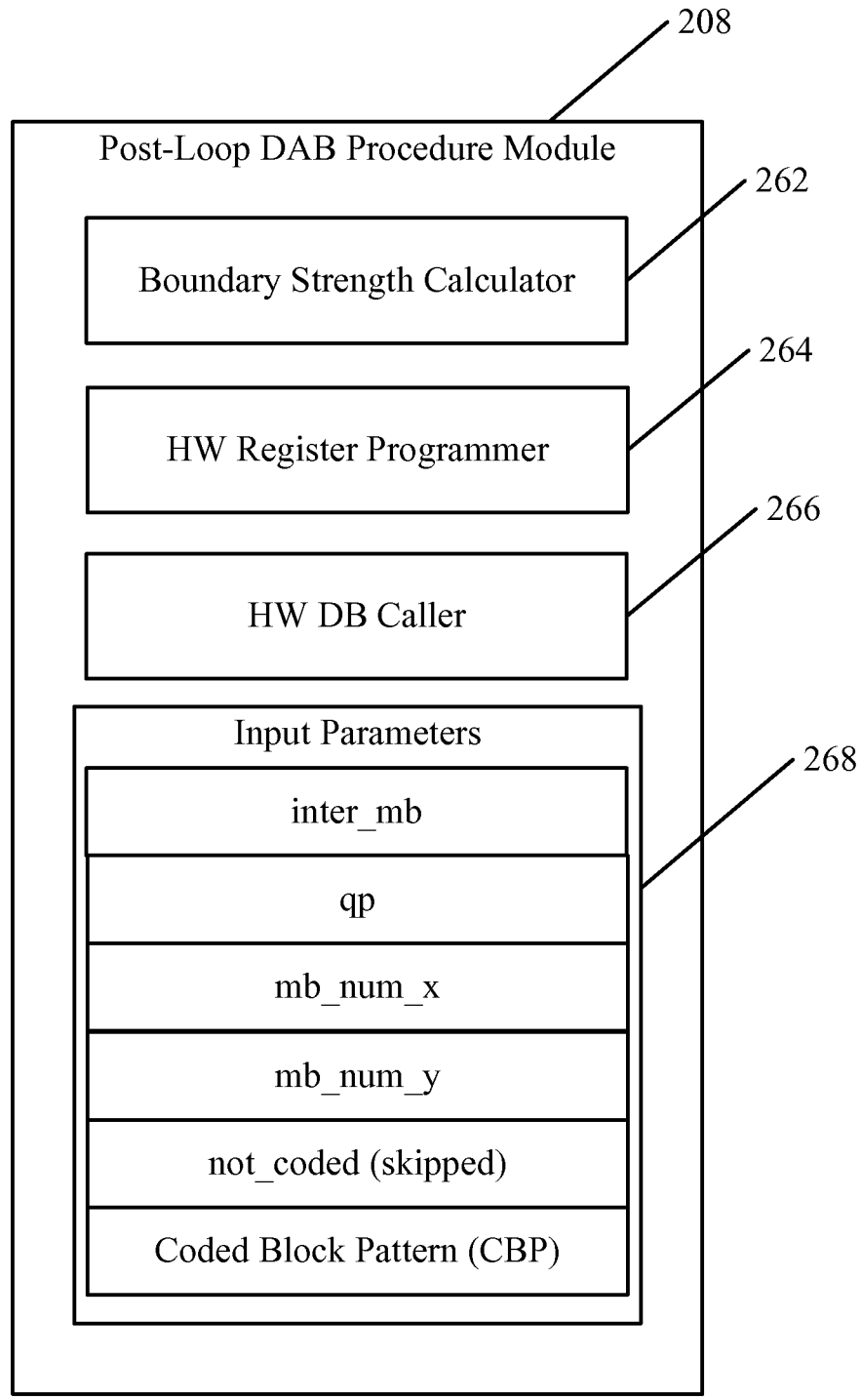
FIG. 10 shows a post-loop DAB procedure module.

FIG. 10 shows a post-loop DAB procedure module 208. The post-loop DAB procedure module 208 performs the post-loop DAB filtering operations using an existing in-loop deblocking filter engine 60A. The post-loop DAB procedure module 208 has a boundary strength calculator 262 which calculates the boundary strength (BS) based on the rules specified below, some of which violate the H.264 standard. The post-loop DAB procedure module 208 also includes a HW register programmer 264 and a HW in-loop DB caller 266 which is called once per macroblock (MB).

The input parameters for the post-loop DAB procedure module 208 include inter_mb, qp, mb_num_x (MB number along horizontal direction), mb_num_y (MB number along vertical direction), not_coded (skipped) and CBP (coded block pattern). The parameter not_coded (skipped) is a flag to indicate if the MB is not coded. If the flag is set, the MB is not coded. Hence, motion vector and texture information are not carried in bitstream. The MB is reconstructed by motion compensation with motion vector=default motion vector. It should be noted that a default motion vector is defined differently for different codecs. The parameter coded block pattern CPB is a set of flags where each flag is used to indicate if the corresponding block in a MB is coded. A value 0 designates that the corresponding block (note here the unit is block rather than MB) is not coded, and thus no texture information is in bitstream.

BS Calculation

In various configurations below, flowchart blocks are performed in the depicted order or these blocks or portions thereof may be performed contemporaneously, in parallel, or in a different order.

A new set of rule for the BS decision process based on coding parameters (MB Type, qp, etc.) are substituted. As mentioned previously, boundary strength (BS) is directly linked to the filtering strength. A strong filtering operation is exploited when BS=4, a weak filtering operation is exploited when BS=1, 2 or 3, and no filtering operation is exploited when BS=0. In the exemplary configuration, three boundary strengths are used which include 4, 2 or 0.

Ideally, content is also an important factor for the BS decision process. A strong filtering operation may be used in smooth regions because artifacts are more visible in smooth areas. However, a low complexity implementation prevents the configuration of the apparatus 70 to have pixel access. Thus, there is no way to have a content analysis module under some existing architectures (besides the simple spatiality activity checking in HW).

Figure 11:
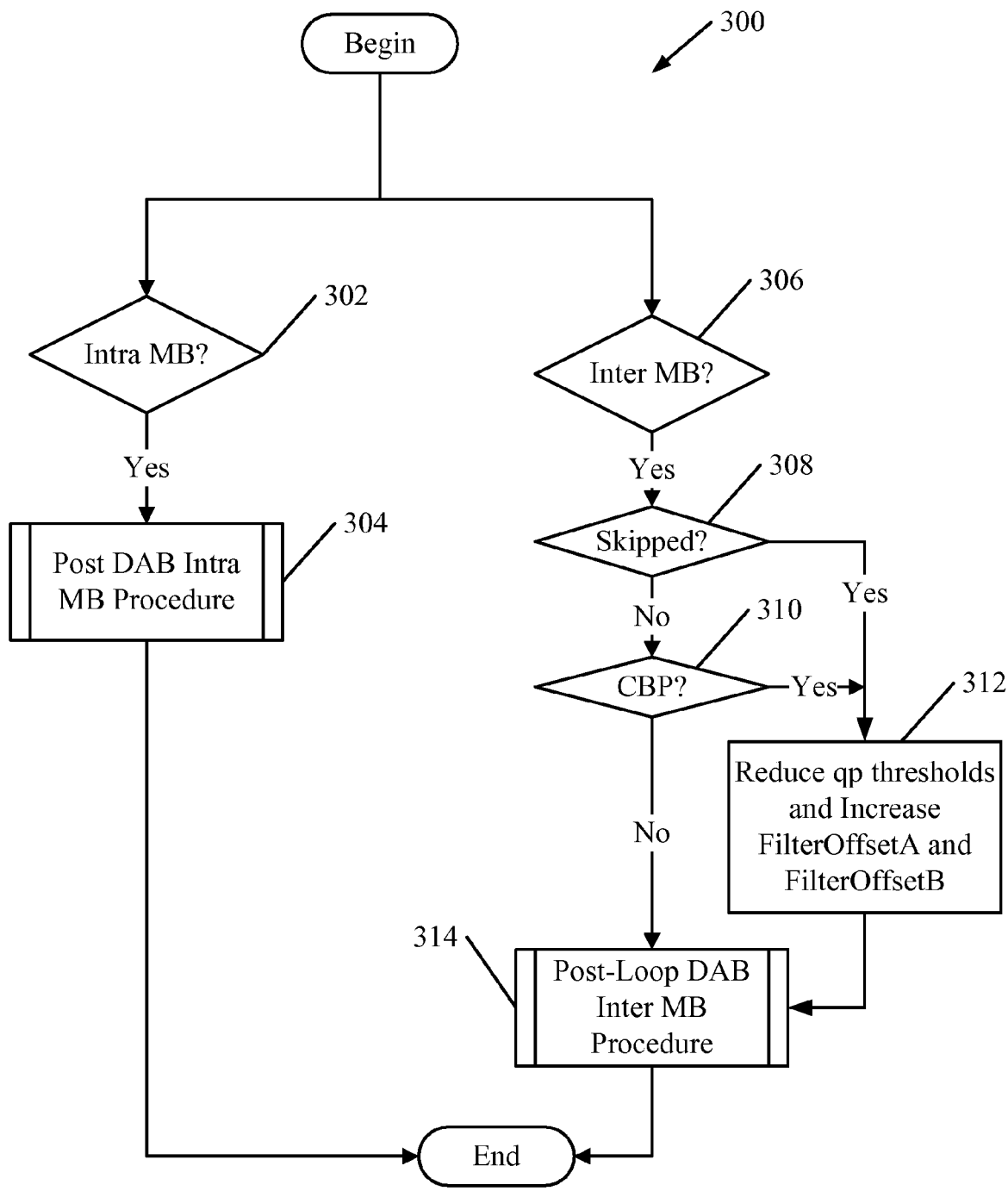
FIG. 11 is a general flow chart of the adaptable post-loop DAB process.
Figure 12:
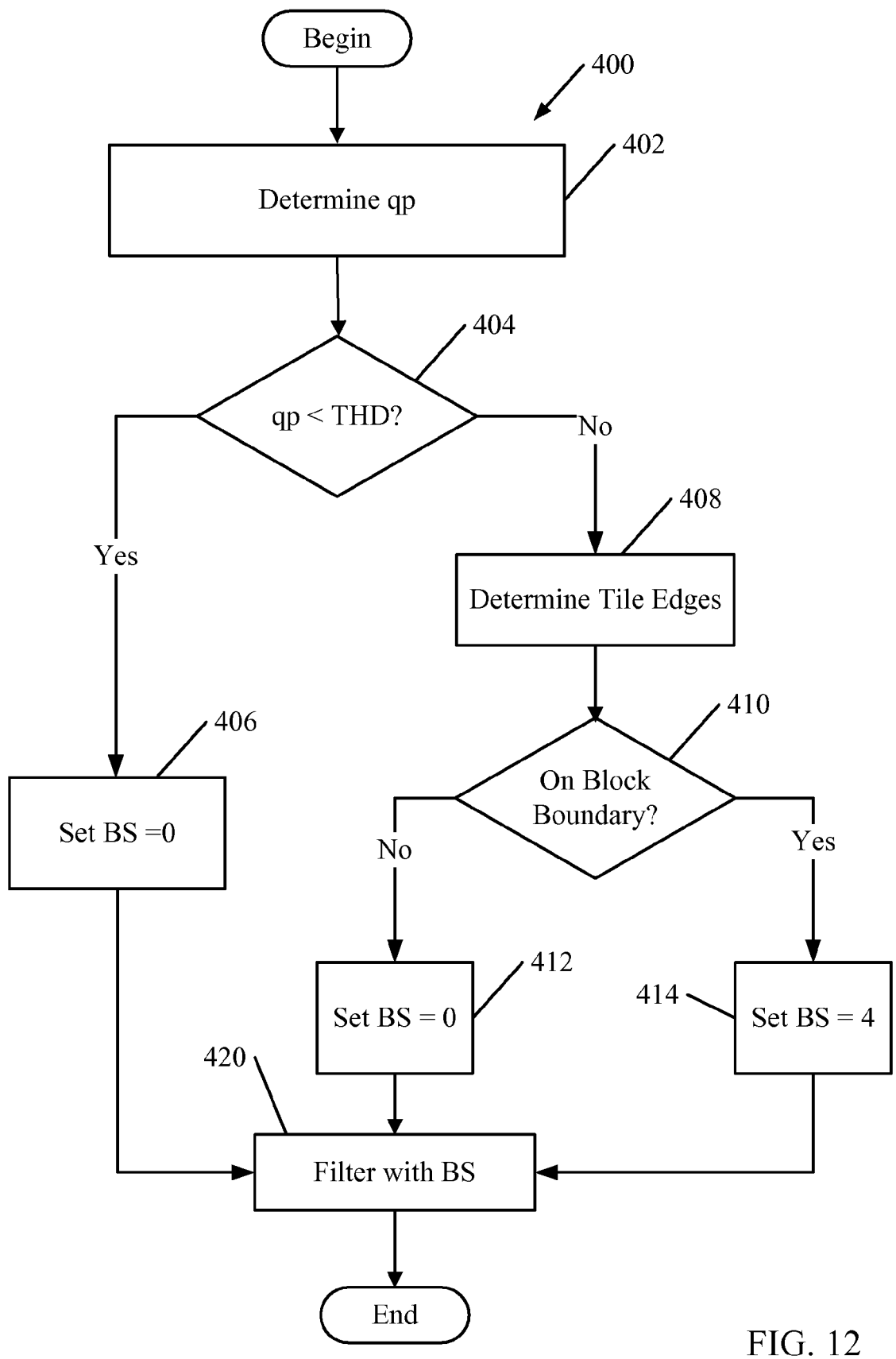
FIG. 12 is a general flow chart of the post-loop DAB intra MB procedure.

FIG. 11 is a general flow chart of the adaptable post-loop DAB process 300. In the exemplary configuration, the BS is determined based on four coding parameters: intra/inter type, qp (quantization step size), skip MB and CBP. The adaptable post-loop DAB process 300 begins with block 302 where a determination is made whether the MB is an Intra MB. If the determination is "YES" then the block 302 is followed by block 304. At block 304 a post-loop DAB intra MB procedure 400, shown in FIG. 12 is performed. Block 304 ends the process 300.

Figure 17:
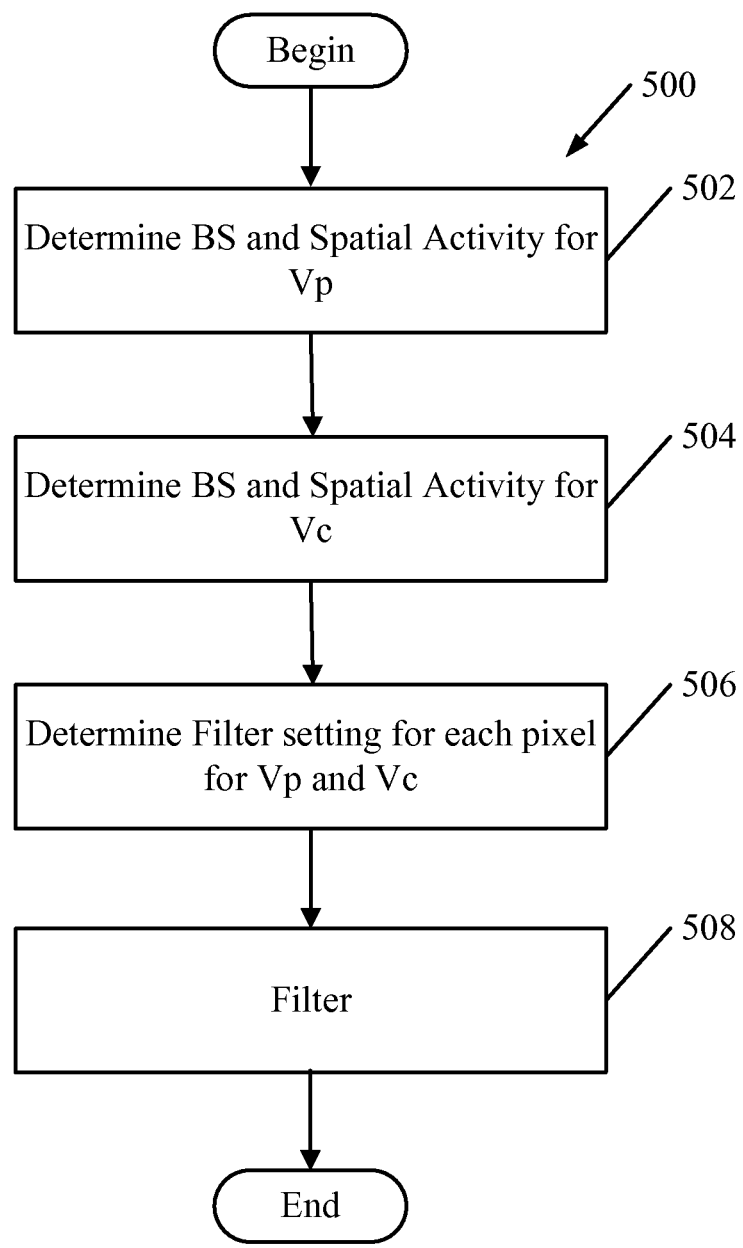
FIG. 17 shows a general flow chart of a simplified post-loop DAB inter MB procedure.

In FIG. 11, the block 306 is shown for illustrative purposes, and generally denotes that a decision is made whether the MB is an Inter MB. If the current MB is an Inter MB, a determination is made whether the inter MB is a skipped MB, at block 308. If the determination at block 308 is "No," then block 308 is followed by block 310 where a determination is made whether the MB is a CBP. If the decisions at blocks 308 and 310 are both "No" meaning that the MB is not a skipped MB or a CBP MB, then process 300 proceeds to the post-loop DAB inter MB procedure 500, as shown in FIG. 17. However, if the decision at block 308 or block 310 is "Yes" the process 300 reduces the qp thresholds and FilterOffsetA and FilterOffsetB accordingly before performing the post-loop DAB inter MB procedure 500, as shown in FIG. 17.

Figure 13:
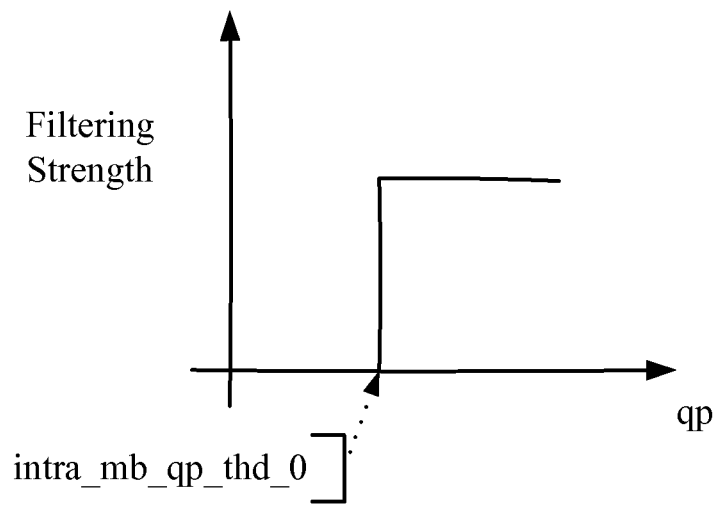
FIG. 13 shows a graph of a qp-filtering strength relationship for intra MBs.
Figure 14:
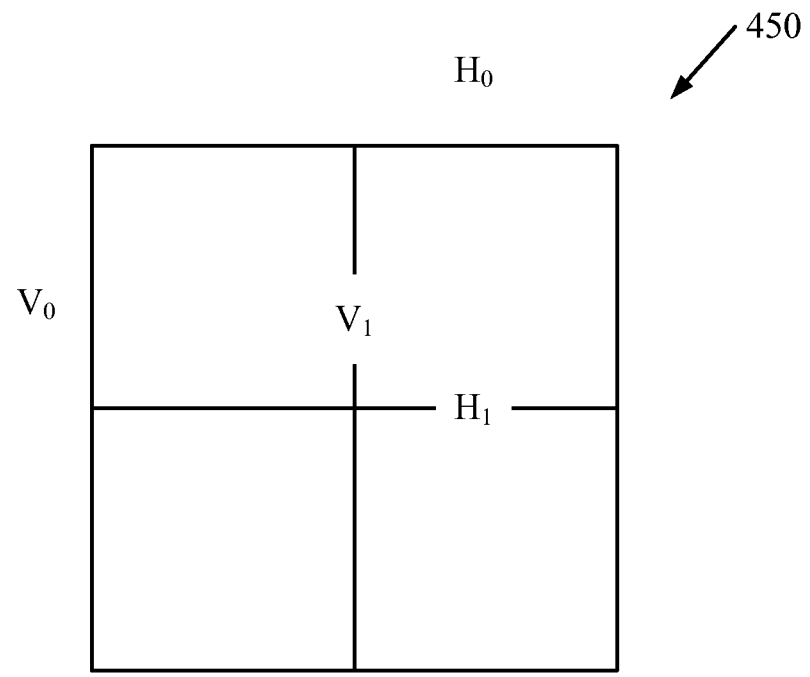
FIG. 14 shows exemplary tile edge locations in an 8×8 block.

FIG. 12 is a general flow chart of the post-loop DAB intra MB process 400 (simplified version). The process 400 will be described in combination with FIGS. 13 and 14. FIG. 13 shows a qp-filtering strength relationship for the intra MBs. FIG. 14 shows exemplary tile edge locations in an 8×8 block 450.

For intra MBs, the boundary strength (BS) is decided only based on the quantization step size (qp) because there are no such cases like skip MBs and CPB 0 blocks in the intra MBs. Moreover, because intra MBs do not have inherited blockiness issues, the DAB filtering operations should be only applied on pixels around the 8×8 block boundary, as best seen in FIG. 14.

The post-loop DAB intra MB procedure 400 begins with block 402 where the qp is determined. Block 402 is followed by block 404 where a determination is made whether qp is less than a threshold THD where THD is intra_mb_qp_thd in FIG. 13. If the determination at block 404 is "Yes," the BS is set to zero (0) at block 406. If the determination at block 404 is "No," than the tile edges are determined at block 408. The block 408 may be placed before block 404. Block 408 is followed by block 410 where a determination is made for each tile edge whether the tile edge is on the block boundary. If the determination at block 410 is "Yes," for a tile edge, the BS for that tile edge is set to 4 at block 414. The BS is set to zero (0) for those tile edges which are not located on the block boundary at block 412. Blocks 412 and 414 proceed to block 420 where filtering takes place using in-loop deblocking filter engine 60A using the calculated BS. The block 420 ends the procedure 400. Block 406 is shown proceeding to block 420 for filtering for illustrative purposes.

With specific reference to FIG. 14, an exemplary 8×8 block 450 is shown. For illustrative purposes, the current MB has tile edges $V_0, V_1, H_0, H_1$. Note that $V_0$ is located on the block boundary between current block and the block to the left; $H_0$ is located on the block boundary between current block and the block above; $V_1$ is four samples away from $V_0$ in horizontal direction; and $H_1$ is four samples away from $H_0$ in vertical direction.

The BS rule calculation for intra MBs is shown for the specific example in FIG. 14. Thus, the values in Table 3 would change depending on the location of the tiles edges.

TABLE 3

| BS calculation for intra MBs | | | | |
|---|---|---|---|---|
| | $BS(V_0)$ | $BS(V_1)$ | $BS(H_0)$ | $BS(H_1)$ |
| qp>intra_mb_qp_thd | 0 | 0 | 0 | 0 |
| qp≥intra_mb_qp_thd | 4 | 0 | 4 | 0 |

Inter MBs

The inherited blockiness may become an issue for inter MBs. Thus, the post-loop DAB apparatus 70 in general corrects the inherited blockiness by turning on the in-loop deblocking filter engine 60A for the tile edges not located on block boundary. Specifically, the BS of a tile edge is decided based on the following: current qp, current skipped MB, current CBP, neighbor's MB type and neighbor's qp. Two configurations are designed for the inter MB BS calculations. The two configurations include a simplified version and a complete version. The simplified version makes decisions based on the coding parameters of the current MB, while the complete version considers more factors, including neighbor's coding parameters, in the BS calculation.

Simplified Version

FIG. 15 shows graph of a qp-filtering strength relationship for inter MBs. FIG. 16 shows an exemplary relationship between a current tile edge and a previous tile edge. The simplified version does not use a neighbor's information for the BS calculation. Hence, MB's coding parameters do not need to be stored for future use. Therefore, the simplified version provides both MIPs and memory savings. The relationship between qp and the filtering strength is illustrated in FIG. 15. Different filtering strength is achieved by assigning different BSs for tile edges $V_0, V_1, H_0, H_1$, as described in Table 4A.

All pixels in a block may be modified if the BSs for all tile edges are greater than zero, such as the last case in the last three lines in Table 4A. The effective filtering taps may be more than five because some pixels may be filtered twice. However, the spatial activity checking (conditions of Eq. (1), (2) and (3)) may prohibit some pixels from filtering. The filtering decision for each pixel is based on the BSs of the current and previous tiles and spatial activity checking, is listed in Table 5, in which $V_c$ denotes current tile edge, $V_p$ denotes previous tile edge (FIG. 16), 'x' denotes no filtering, 'w' denotes weak filtering and 's' denotes strong filtering. The samples $Q_1, Q_2, Q_3$ and $Q_4$ have different meanings for $V_c$ and $V_p$. When filtering $V_c$, the samples $Q_1, Q_2, Q_3$ and $Q_4$ are equivalent to $P_1, P_2, P_3$ and $P_4$ in the FIG. 3. When filtering $V_p$, the samples $Q_1, Q_2, Q_3$ and $Q_4$ are equivalent to $P_5, P_6, P_7$ and $P_8$ in the FIG. 3. The strongest filtering occurs when $BS(V_c)=4$, $BS(V_p)=4$, and all spatial activity checking conditions (1), (2) and (3) hold true.

TABLE 4A

| BS calculation for inter MBs (simplified version). | | | | |
|---|---|---|---|---|
| Current MB qp | $BS(V_0)$ | $BS(V_1)$ | $BS(H_0)$ | $BS(H_1)$ |
| qp<inter_mb_qp_thd_boundary_0 | 0 | 0 | 0 | 0 |
| inter_mb_qp_thd_boundary_0 ≤ qp < inter_mb_qp_thd_inside_0 | 2 | 0 | 2 | 0 |
| inter_mb_qp_thd_inside_0 ≤ qp < inter_mb_qp_thd_boundary_4 | 2 | 2 | 2 | 2 |
| inter_mb_qp_thd_boundary_4 ≤ qp < inter_mb_qp_thd_inside_4 | 4 | 2 | 4 | 2 |
| qp≥ inter_mb_qp_thd_inside_4 | 4 | 4 | 4 | 4 |

TABLE 4B

Spatial Activity for inter MBs.

| Spatial activity case | Description |
|---|---|
| A | Chroma or Condition (1) or (3) is false |
| B | Luma and Condition (1) and (3) are true |
| C | Chroma or Condition (3) is false |
| D | Luma and Condition (3) is true |
| E | Chroma or Condition (1) or (2) is false |
| F | Luma and Condition (1) and (2) are true |
| G | Chroma or Condition (2) is false |
| H | Luma and Condition (2) is true |

The Conditions (1), (2) and (3) are based on equations Eq. (1), (2) and (3).

TABLE 5

The actual filtering for each pixel, based on current tile edge BS, previous tile edge BS and spatial activity checking.

| BS | Spatial activity | BS | Spatial activity | filtering | $Q_1$ | $Q_2$ | $Q_3$ | $Q_4$ |
|---|---|---|---|---|---|---|---|---|
| 0 | — | 0 | — | $V_p$ | X | X | X | x |
|   |   |   |   | $V_c$ | X | X | X | x |
| 2 | C | 0 | — | $V_p$ | W | X | X | x |
|   |   |   |   | $V_c$ | X | X | X | x |
| 2 | D | 0 | — | $V_p$ | W | W | X | x |
|   |   |   |   | $V_c$ | X | X | X | x |
| 2 | C | 2 | G | $V_p$ | W | X | X | x |
|   |   |   |   | $V_c$ | X | X | X | w |
| 2 | C | 2 | H | $V_p$ | W | X | X | x |
|   |   |   |   | $V_c$ | X | X | W | w |
| 2 | D | 2 | G | $V_p$ | W | W | X | x |
|   |   |   |   | $V_c$ | X | X | X | w |
| 2 | D | 2 | H | $V_p$ | W | W | X | x |
|   |   |   |   | $V_c$ | X | X | W | w |
| 4 | A | 2 | G | $V_p$ | S | X | X | x |
|   |   |   |   | $V_c$ | X | X | X | w |
| 4 | A | 2 | H | $V_p$ | S | X | X | x |
|   |   |   |   | $V_c$ | X | X | W | w |
| 4 | B | 2 | G | $V_p$ | S | S | S | x |
|   |   |   |   | $V_c$ | X | X | X | w |
| 4 | B | 2 | H | $V_p$ | S | S | S | x |
|   |   |   |   | $V_c$ | X | X | W | w |
| 4 | A | 4 | E | $V_p$ | S | X | X | x |
|   |   |   |   | $V_c$ | X | X | X | s |
| 4 | A | 4 | F | $V_p$ | S | X | X | x |
|   |   |   |   | $V_c$ | X | S | S | s |
| 4 | B | 4 | E | $V_p$ | S | S | S | x |
|   |   |   |   | $V_c$ | X | X | X | s |
| 4 | B | 4 | F | $V_p$ | S | S | S | x |
|   |   |   |   | $V_c$ | X | S | S | s |

Skipped MBs and CBP 0 Blocks

Returning again to FIG. 11, because there is no texture coding for skipped MBs and CBP 0 blocks, the skipped MBs and the blocks with CBP=0 inherit 100% of the artifacts from reference frames. To remove these artifacts, a stronger filtering is needed. It is very different from the H.264 coding standard, in which a weaker filter is used for the skipped MBs because the configuration of the in-loop DB 50 assumes that the blockiness in reference frames has been removed.

The stronger filtering is achieved by reducing all qp thresholds (inter_mb_qp_thd_boundary_0, inter_mb_qp_thd_inside_0, inter_mb_qp_thd_boundary_4 and inter_mb_qp_thd_inside_4) by a constant, and increasing the values of FilterOffsetA and FilterOffsetB. The reason to have higher FilterOffsetA and FilterOffsetB is to increase the chance to pass the spatial activity tests (1), (2) and (3) and thus more samples would be filtered.

In implementation, the qp is artificially increased by a constant qp_jump_for_not_coded_block for skipped MBs and cbp0 blocks, and pass the modified qp to the in-loop deblocking filter engine 60A. This special treatment is applied to blocks with CBP=0 and skipped MBs. To simplify the procedure, a MB is treated the same as a skipped MB if the number of luma CBP 0 blocks in that MB is more than the threshold num_not_coded_blocks_thd.

FIG. 17 shows a general flow chart of a simplified post-loop DAB inter MB procedure 500. The simplified post-loop DAB inter MB procedure 500 begins at block 502 where the BS and spatial activity for the previous tile edge $V_p$, This may take place during the processing of the previous tile edge $V_p$. Block 502 is followed by block 504 where the BS and spatial activity for the current tile edge $V_c$ is determined. The BS and spatial activity as set forth above in Tables 4A and 4B for example in FIG. 14.

Block 504 is followed by block 506 where the filter setting for each pixel $Q_1$, $Q_2$, $Q_3$ and $Q_4$ is determined for $V_p$ and $V_c$ as shown in Table 5 above. Block 506 is followed by block 508 where the MB is filtered according to Table 5 for the example in FIG. 14.

Complete Version

In complete version, the coding parameters of the neighboring MBs (left and above) affect the BS decision on the MB boundary. For those tile edges located inside of a MB, the BSs are calculated the same as the simplified version. Let V denote a boundary between two MBs A and B, $BS_A(V)$ and $BS_B(V)$ are the BSs determined by MB A and B based on the rules described in the simplified version, then the new BS(V) is calculated according to equation Eq. (4)

$$BS(V) = \text{Max}(BS_A(V), BS_B(V)) \quad (4)$$

For instance, suppose MB A is an intra MB and MB B is an inter MB with qp<inter_mb_qp_thd_boundary_0, then $BS_A(V)=4$, $BS_B(V)=0$. The final BS decision BS(V), according to Eq. (4), is 4. The detailed rule of BS calculation for a vertical edge is listed in Table 6. The BS calculation for a horizontal edge can be derived in the same manner.

However, in the complete version, the skipped MBs and CBP0 blocks are processed the same as simplified version shown in FIG. 11 and Tables 4A, 4B and 5.

Figure 18:
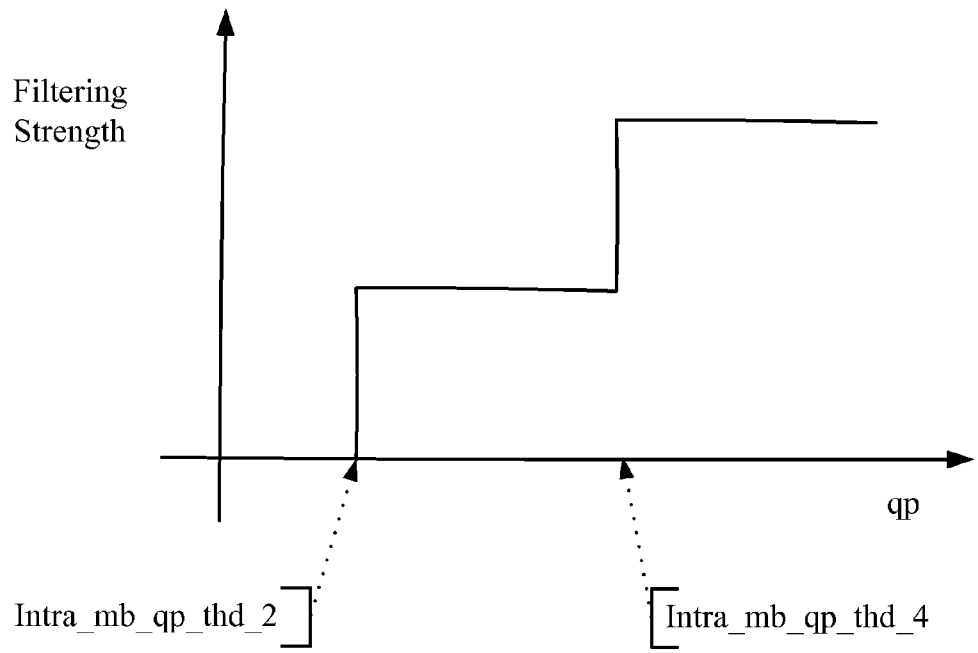
FIG. 18 shows a graph of a qp-filtering strength relationship for intra MBs for the complete version.
Figure 19:
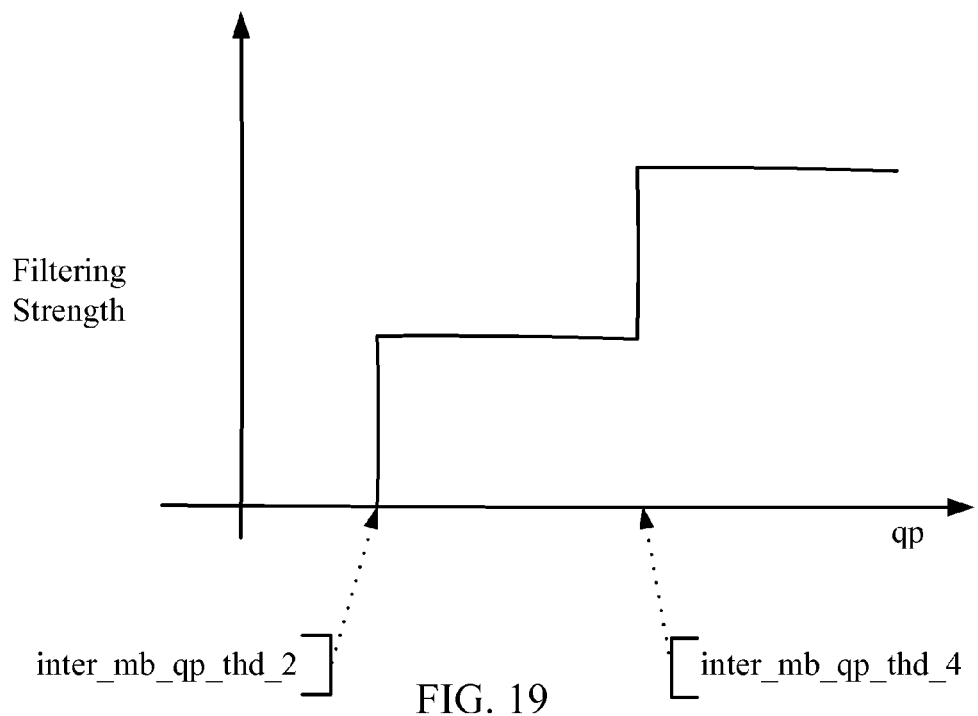
FIG. 19 shows a graph of a qp-filtering strength relationship for inter MBs for the complete version.

FIG. 18 shows a graph of a qp-filtering strength relationship for intra MBs for the complete version. FIG. 19 shows a graph of a qp-filtering strength relationship for inter MBs for the complete version.

TABLE 6

BS calculation for inter MBs (complete version).

| | Left MB | | | |
|---|---|---|---|---|
| Current MB qp | MB type | qp | BS ($V_0$) | BS ($V_1$) |
| qp<inter_mb_qp_thd_boundary_0 | inter | qp<inter_mb_qp_thd_boundary_0 | 0 | 0 |
| qp<inter_mb_qp_thd_boundary_0 | inter | inter_mb_qp_thd_boundary_0 ≤ qp < inter_mb_qp_thd_boundary_4 | 2 | 0 |

TABLE 6-continued

BS calculation for inter MBs (complete version).

| | Left MB | | | |
|---|---|---|---|---|
| Current MB qp | MB type | qp | BS ($V_0$) | BS ($V_1$) |
| inter_mb_qp_thd_boundary_0 ≤ qp < inter_mb_qp_thd_inside_0 | inter | qp<inter_mb_qp_thd_boundary_4 | 2 | 0 |
| inter_mb_qp_thd_boundary_0 ≤ qp < inter_mb_qp_thd_inside_0 | inter | qp<inter_mb_qp_thd_boundary_4 | 2 | 2 |
| qp<inter_mb_qp_thd_inside_0 | intra | Any | 4 | 0 |
| qp<inter_mb_qp_thd_inside_0 | inter | qp≥inter_mb_qp_thd_boundary_4 | 4 | 0 |
| inter_mb_qp_thd_inside_0 ≤ qp < inter_mb_qp_thd_inside_4 | intra | Any | 4 | 2 |
| inter_mb_qp_thd_inside_0 ≤ qp < inter_mb_qp_thd_inside_4 | inter | qp≥inter_mb_qp_thd_boundary_4 | 4 | 2 |
| inter_mb_qp_thd_boundary_4 ≤ qp < inter_mb_qp_thd_inside_4 | Inter | Any | 4 | 2 |
| qp≥ inter_mb_qp_thd_inside_4 | any | Any | 4 | 4 |

Although H.264 has an in-loop DB 50, artifact is still an issue when the content is coded at a low bit rate. It needs a post-loop DAB apparatus 70 to remove the artifacts introduced by coding. Although the H.264 in-loop DB 50 and the post-loop DAB apparatus 70 share the same core deblocking filter engine 60A, the post-loop DAB apparatus 70 provides a stronger filtering. The stronger filtering is because a stronger BS may be assigned for an edge in the post-loop DAB 70, but it is impossible in the in-loop DB 50. The BS in the in-loop DB 50 is determined by the rules specified in the H.264 standard. The maximum BS is two in the case where both blocks are Inter. Another reason stronger filtering can be accomplished is because a larger FilterOffsetA and FilterOffsetB may be assigned in the post-loop DAB 70, but the FilterOffsets used in in-loop DB 50 is read from the bitstream.

Figure 20A:
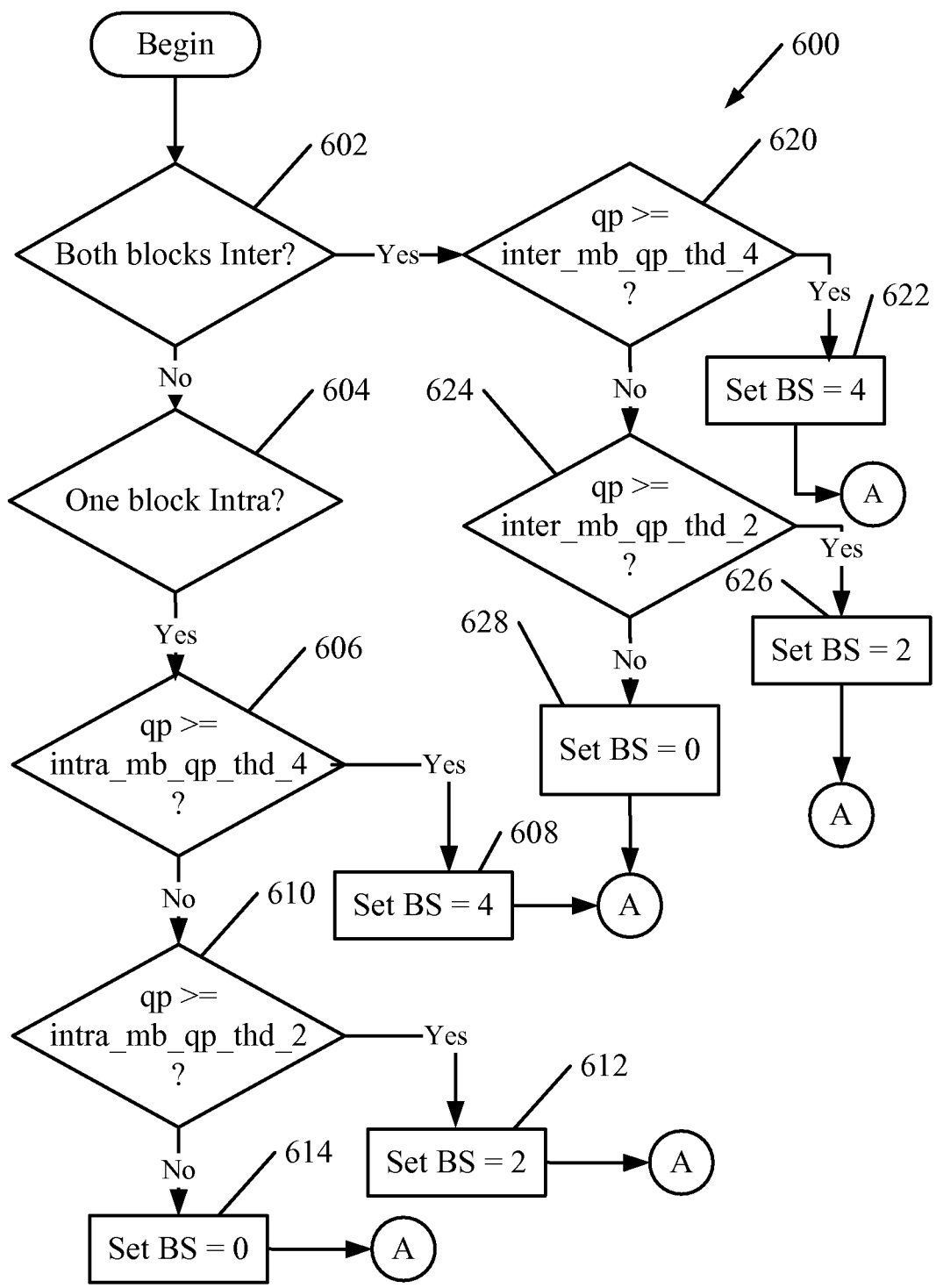
FIGS. 20A and 20B show a flow diagram of a procedure to set the boundary strength in the complete version.
Figure 20B:
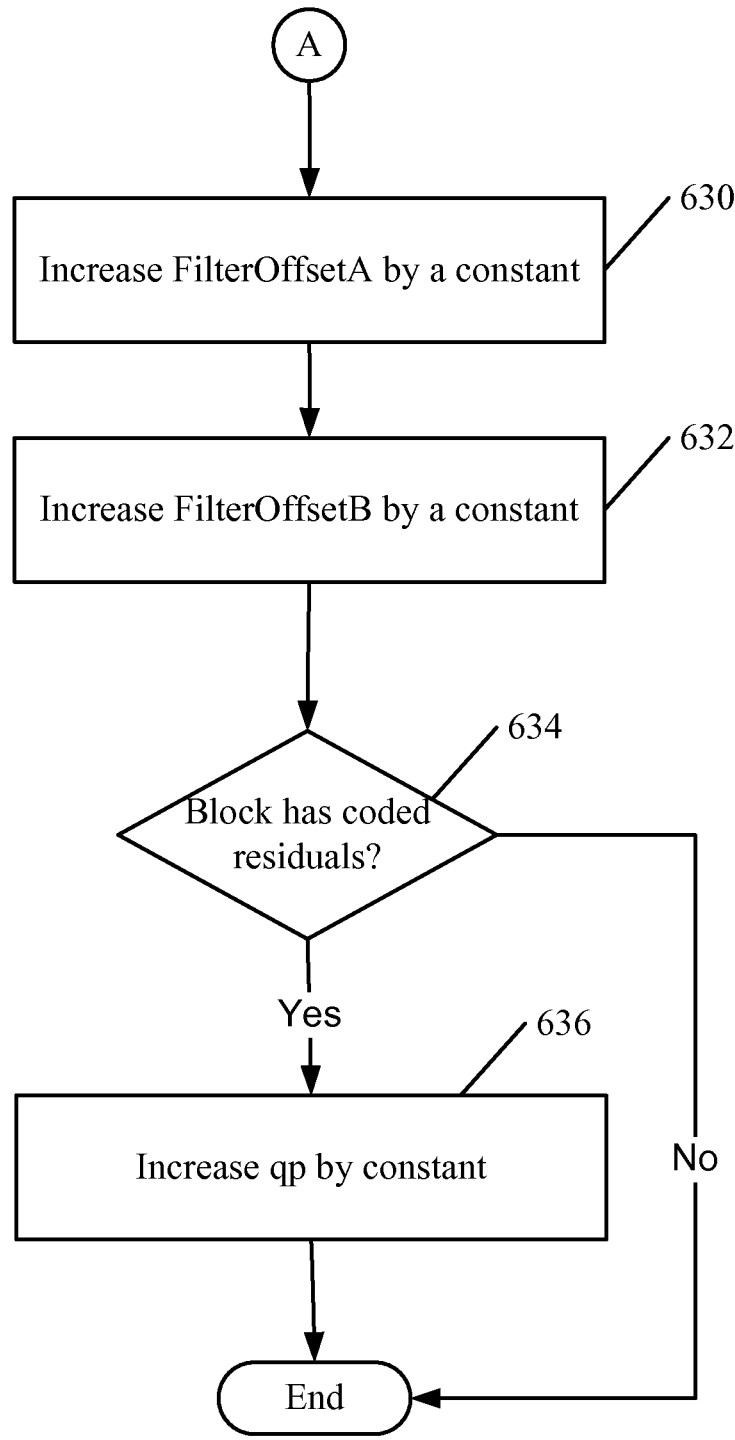

FIGS. 20A and 20B show a flow diagram of a procedure 600 to set the boundary strength in the complete version. The procedure 600 begins with block 602 where a determination is made whether both blocks (current and left) are Inter type blocks. As can be appreciated, the determination of block 602 could be skipped and substituted with block 604 or some other determination to determine the types of the blocks. If the determination at block 602 is "No," meaning one block may be an Intra type, then block 602 is followed by block 604. At block 604 there is a determination whether one of the blocks is an Intra type. If the determination is "Yes," then block 604 is followed by block 606. At block 606 a determination is made whether either block has a qp greater than or equal to intra_mb_qp_thd_4. If the determination at block 606 is "Yes," then the BS is set to 4 at block 608. However, if the determination at block 606 is "No," then block 606 is followed by block 610 where a determination is made whether either block has a qp greater than or equal to intra_mb_qp_thd 2. If the determination at block 610 is "Yes," then the BS is set to 2 at block 612. However, if the determination at block 610 is "No," then the BS is set to 0.

Returning again to block 602, if the determination at block 602 "Yes," meaning both blocks are Inter type, then block 602 is followed by block 620. At block 620 a determination is made whether either block has a qp greater than or equal to inter_mb_qp_thd_4. If the determination at block 620 is "Yes," then the BS is set to 4 at block 622. However, if the determination at block 620 is "No," then block 620 is followed by block 624 where a determination is made whether either block has a qp greater than or equal to inter_mb_qp_thd_2. If the determination at block 624 is "Yes," then the BS is set to 2 at block 626. If the determination at block 624 is "No," then the BS is set to 0 at block 628. Blocks 608, 612, 614, 622, 626 and 628 all continue to block 630 of FIG. 20B.

At block 630, the FilterOffsetA is increased by a constant. Block 630 is followed by block 632 where the FilterOffsetB is increased by a constant. Block 632 is followed by block 634 where a determination is made whether a block has coded residuals. If the determination is "No," the procedure 600 ends. However, if the determination is "Yes," then block 634 is followed by block 636. At block 636, the qp is increased by a constant. Block 636 also ends the procedure 600.

The procedure 600, in general, includes the following:
(1) Set BS=4 if one of the blocks is intra and either block has qp greater than or equal to intra_mb_qp_thd_4.
(2) Set BS=2 if one of the blocks is intra and either block has qp greater than or equal to intra_mb_qp_thd_2.
(3) Set BS=4 if both blocks are inter and either block has qp greater than or equal to inter_mb_qp_thd_4.
(4) Set BS=2 if both blocks are inter and either block has qp greater than or equal to inter_mb_qp_thd_2.
(5) Increase FilterOffsetA and FilterOffsetB by a constant.
(6) Increase qp by a constant if the block has no coded residuals.

Increasing FilterOffsetA and FilterOffsetB increases the chance to pass the spatial activity tests in equations Eq. (1), (2) and (3) and thus more samples would be filtered. Furthermore, increasing qp by a constant decreases the parameters inter_mb_qp_thd_4 and inter_mb_qp_thd_2.

Experimental Results

In experimental results, a comparison of the second approach using a post-loop deblocker with high MIPs denoted as SMCDB, the disclosed DAB processes denoted as DAB and no DAB operations are shown in Table 7. The visual MOS score is listed in Table 7, in which the LCDB has compatible subjective score as SMCDB, and both of them are much better than no DB.

TABLE 7

Visual MOS score.

| | No DAB | SMCDB | DAB |
|---|---|---|---|
| Visual MOS score | 2.0 | 3.9 | 3.9 |

In view of the above, the post-loop DAB apparatus 70 uses the existing hardware of the in-loop deblocking filter engine 60A as a core and carefully chooses the BS for each of the tile edges. To eliminate the annoying inherited blockiness, the pixels in the inside of a block may be filtered, which is achieved by setting a non-zero BS for the tile edges in the middle of a block. In short, the BS is determined by qp, inter MB, skipped MB and CBP.

To keep a low complexity configuration, two versions have been described. The simplified version calculates BSs based on the coding parameters of current MB (the MB to be filtered), no information from neighboring MBs is required. However, the complete version calculates the BSs based on the coding parameters of both current and neighboring MBs.

The low complexity configuration of the DAB apparatus 70' in FIG. 2C is also designed as a post-deblocker to universally correct blockiness for a codec without an in-loop DB 50, such as MPEG4 and H.263P0 codecs. The procedures to calculate the boundary strength (BS) described in relation to the DAB apparatus 70 is essentially the same for 70'. Hence, no further discussion is necessary. The DAB apparatus 70 or 70 removes blocking artifacts successfully, with very small MIPs (2.5 MIPs for simplified version and 4 MIPs for complete version) and memory requirements.

In one or more exemplary configurations, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed configurations is provided to enable any person skilled in the art to make or use the disclosure. Various modifications to these configurations will be readily apparent to those skilled in the art, and the generic principles defined herein may be applied to other configurations without departing from the spirit or scope of the disclosure. Thus, the disclosure is not intended to be limited to the configurations shown herein but is to be accorded the widest scope consistent with the principles and novel features disclosed herein.

What is claimed is:

1. A device comprising:
   a processor;
   a memory coupled with a processor;
   the processor operative to implement a set of instructions to commandeer an in-loop deblocking filtering engine and to universally correct blockiness in a decoded output signal during a post-loop filtering operation using the in-loop deblocking filtering engine, wherein universally correcting blockiness comprises:
   determine tile edges of inter macroblocks;
   turning on the in-loop deblocking filtering engine for tile edges not located on a block boundary of a respective inter macroblock to correct inherited blockiness;
   performing a strong filtering operation on skipped inter macroblocks by reducing all quantization step size thresholds by a constant, increasing a first filter offset, and increasing a second filter offset, wherein the skipped inter macroblocks are not coded and exclude motion vector and texture information in bitstream;
   performing the strong filtering operation on inter macroblocks that are not skipped but for which a coded block pattern is equal to zero by reducing all quantization step size thresholds by the constant, increasing the first filter offset, and increasing the second filter offset;
   determine tile edges of intra macroblocks,
   correcting the blockiness for the intra macroblocks using a calculated boundary strength based on a plurality of quantization step size thresholds and applying the post-loop filtering operation according to the calculated boundary strength on pixels around the block boundary of respective intra macroblocks; and
   wherein the calculated boundary strength is equal to an integer greater than zero, when the determined tile edges of intra macroblocks are on the block boundary of respective intra macroblocks and the calculated boundary strength is equal to zero, when the determined tile edges are not on the block boundary of respective intra macroblocks.

2. The device of claim 1, wherein the calculated boundary strength is based on coding parameters of a current macroblock to be filtered and no information from neighboring macroblocks.

3. The device according to claim 1, wherein the device is a handset and the handset is a cellular phone, a wireless device, a wireless communications device, a video game console, a wirelessly-equipped personal digital assistant (PDA), a laptop computer, or a video-enabled device.

4. An integrated circuit comprising:
   a decoder having an in-loop deblocking filtering engine;
   a processor;
   a memory coupled with the processor;
   the processor operative to implement a set of instructions to commandeer an in-loop deblocking filtering engine and to universally correct blockiness in a decoded output signal during a post-loop filtering operation using the in-loop deblocking filtering engine, wherein universally correcting blockiness comprises:
   determine tile edges of inter macroblocks;
   turning on the in-loop deblocking filtering engine for tile edges not located on a block boundary of respective inter macroblocks to correct inherited blockiness;
   performing a strong filtering operation on skipped inter macroblocks by reducing all quantization step size thresholds by a constant, increasing a first filter offset, and increasing a second filter offset, wherein the skipped inter macroblocks are not coded and exclude motion vector and texture information in bitstream;

performing the strong filtering operation on inter macroblocks that are not skipped but for which a coded block pattern is equal to zero by reducing all quantization step size thresholds by the constant, increasing the first filter offset, and increasing the second filter offset;

determine tile edges of intra macroblocks, correcting the blockiness for the intra macroblocks using a calculated boundary strength based on a plurality of quantization step size thresholds and applying the post-loop filtering operation according to the calculated boundary strength on pixels around the block boundary of respective intra macroblocks; and wherein the calculated boundary strength is equal to an integer greater than zero, when the determined tile edges of intra macroblocks are on the block boundary of respective intra macroblocks and the calculated boundary strength is equal to zero, when the determined tile edges are not on the block boundary of respective intra macroblocks.

5. The integrated circuit of claim 4, wherein the calculated boundary strength is based on coding parameters of a current macroblock to be filtered and no information from neighboring macroblocks.

6. The integrated circuit according to claim 4, wherein the integrated circuit is in a cellular phone, a handset, a wireless device, a wireless communications device, a video game console, a wirelessly-equipped personal digital assistant (PDA), a laptop computer, or a video-enabled device.

7. An apparatus comprising:

decoding means for decoding and having filtering means for in-loop deblocking filtering; commandeering means for commandeering the filtering means; and correcting means for universally correcting blockiness in a decoded output signal during a post-loop filtering operation using the filtering means, wherein the correcting means is configured to:

turn on the in-loop deblocking filtering for tile edges not located on a block boundary of a respective inter macroblock to correct inherited blockiness; and perform a strong filtering operation on skipped inter macroblocks by reducing all quantization step size thresholds by a constant, increasing a first filter offset, and increasing a second filter offset, wherein the skipped inter macroblocks are not coded and exclude motion vector and texture information in bitstream;

perform the strong filtering operation on inter macroblocks that are not skipped but for which a coded block pattern is equal to zero by reducing all quantization step size thresholds by the constant, increasing the first filter offset, and increasing the second filter offset;

determine tile edges of intra macroblocks, correct the blockiness for the intra macroblocks using a calculated boundary strength based on a plurality of quantization step size thresholds and apply the post-loop filtering operation according to the calculated boundary strength on pixels around the block boundary of respective intra macroblocks; and wherein the calculated boundary strength is equal to an integer greater than zero, when the determined tile edges of intra macroblocks are on the block boundary of respective intra macroblocks and the calculated boundary strength is equal to zero, when the determined tile edges are not on the block boundary of respective intra macroblocks.

8. A non-transitory computer readable medium storing instructions for causing one or more processors to:

commandeer an in-loop deblocking filtering engine; and universally correct blockiness in a decoded output signal during a post-loop filtering operation using the in-loop deblocking filtering engine, wherein instructions for universally correcting blockiness comprises instructions for causing the computer to:

determine tile edges of inter macroblocks;

turn on the in-loop deblocking filtering engine for tile edges not located on a block boundary of respective inter macroblocks to correct inherited blockiness;

perform a strong filtering operation on skipped inter macroblocks by reducing all quantization step size thresholds by a constant, increasing a first filter offset, and increasing a second filter offset, wherein the skipped inter macroblocks are not coded and exclude motion vector and texture information in bitstream;

perform the strong filtering operation on inter macroblocks that are not skipped but for which a coded block pattern is equal to zero by reducing all quantization step size thresholds by the constant, increasing the first filter offset, and increasing the second filter offset;

determine tile edges of intra macroblocks, correct the blockiness for the intra macroblocks using a calculated boundary strength based on a plurality of quantization step size thresholds and apply the post-loop filtering operation according to the calculated boundary strength on pixels around the block boundary of respective intra macroblocks; and wherein the calculated boundary strength is equal to an integer greater than zero, when the determined tile edges of intra macroblocks are on the block boundary of respective intra macroblocks and the calculated boundary strength is equal to zero, when the determined tile edges are not on the block boundary of respective intra macroblocks.

9. The non-transitory computer readable medium of claim 8, further comprising instructions to cause the computer to: the calculated boundary strength is based on coding parameters of a current macroblock to be filtered and no information from neighboring macroblocks.

10. The non-transitory computer readable medium of claim 8, further comprising instructions to cause the computer to: the calculated boundary strength is based on coding parameters of both a current macroblock and a neighboring macroblock.

11. A method comprising:

commandeering an in-loop deblocking filtering engine; and correcting blockiness in a decoded output signal during a post-loop filtering operation using the commandeered in-loop deblocking filtering engine, wherein correcting blockiness comprises:

determining tile edges of inter macroblocks;

turning on the in-loop deblocking filtering engine for tile edges not located on a block boundary of a respective inter macroblocks to correct inherited blockiness;

performing a strong filtering operation on skipped inter macroblocks by reducing all quantization step size thresholds by a constant, increasing a first filter offset, and increasing a second filter offset, wherein the skipped inter macroblocks are not coded and exclude motion vector and texture information in bitstream;

performing the strong filtering operation on inter macroblocks that are not skipped but for which a coded block pattern is equal to zero by reducing all quantization step size thresholds by the constant, increasing the first filter offset, and increasing the second filter offset;

determining tile edges of intra macroblocks;

correcting the blockiness for the intra macroblocks using a calculated boundary strength based on a plurality of quantization step size thresholds and applying the post-loop filtering operation according to the calculated boundary strength on pixels around the block boundary of respective intra macroblocks; and wherein the calculated boundary strength is equal to an integer greater than zero, when the determined tile edges of intra macroblocks are on the block boundary of respective intra macroblocks and the calculated boundary strength is equal to zero, when the determined tile edges are not on the block boundary of respective intra macroblocks.

* * * * *